(12) United States Patent
Zhang et al.

(10) Patent No.: US 11,828,840 B2
(45) Date of Patent: Nov. 28, 2023

(54) METHOD FOR DETECTING MOISTURE DAMAGE ON ASPHALT PAVEMENT BASED ON ADAPTIVE SELECTION OF GPR IMAGE GRAYSCALE

(71) Applicant: CHANG'AN UNIVERSITY, Xi'an (CN)

(72) Inventors: Jun Zhang, Xi'an (CN); Jun Tao, Xi'an (CN)

(73) Assignee: CHANG' AN UNIVERSITY, Xi'an (CN)

( * ) Notice: Subject to any disclaimer, the term of this patent is extended or adjusted under 35 U.S.C. 154(b) by 91 days.

(21) Appl. No.: 17/761,207

(22) PCT Filed: Dec. 16, 2020

(86) PCT No.: PCT/CN2020/136765
§ 371 (c)(1),
(2) Date: Mar. 17, 2022

(87) PCT Pub. No.: WO2021/083394
PCT Pub. Date: May 6, 2021

(65) Prior Publication Data
US 2022/0350015 A1    Nov. 3, 2022

(30) Foreign Application Priority Data

Nov. 1, 2019    (CN) .......................... 201911059030.9

(51) Int. Cl.
*G01S 13/88*    (2006.01)
*G06V 10/42*    (2022.01)
(Continued)

(52) U.S. Cl.
CPC .......... *G01S 13/885* (2013.01); *G01N 27/221* (2013.01); *G01S 7/417* (2013.01);
(Continued)

(58) Field of Classification Search
CPC ........ G01S 13/88; G01S 13/885; G01S 13/89; G01S 7/417; G06V 10/42; G06V 10/82; G01V 3/12; G01N 27/221
See application file for complete search history.

(56) References Cited

U.S. PATENT DOCUMENTS

| | | | | |
|---|---|---|---|---|
| 4,698,634 A | * | 10/1987 | Alongi | ................ G01S 13/0209 342/159 |
| 5,384,715 A | * | 1/1995 | Lytton | ..................... G01V 3/12 324/334 |

(Continued)

FOREIGN PATENT DOCUMENTS

| | | |
|---|---|---|
| CN | 109782274 A | 5/2019 |
| CN | 110245642 A | 9/2019 |

(Continued)

OTHER PUBLICATIONS

Jiang Shou-Dong, et al., Research on Inspection of Hidden Diseases of Asphalt Pavement in Moisture State, Maintenance Construction and Machinery, 2015, pp. 79-82.
(Continued)

*Primary Examiner* — Peter M Bythrow
(74) *Attorney, Agent, or Firm* — Bayramoglu Law Offices LLC

(57) ABSTRACT

A method for detecting a moisture damage on an asphalt pavement based on adaptive selection of a penetrating radar (GPR) image grayscale includes the following steps: step 1: obtaining a moisture damage GPR image dataset through asphalt pavement investigation by using a ground GPR, where a GPR image with an appropriate plot scale is selected according to an adaptive GPR image selection method; step 2: adjusting image resolution, specifically, scaling a resolution of an initial GPR image dataset of a damage directly to 224×224 to obtain a BD dataset; step 3: inputting the dataset into a recognition model, specifically, inputting the BD
(Continued)

dataset obtained in step 2 into the recognition model, performing operation by the recognition model, and performing step 4; and step 4: outputting a moisture damage result. The new method truly realizes automatic and intelligent target detection based on the GPR.

10 Claims, 13 Drawing Sheets

(51) Int. Cl.
*G06V 10/82* (2022.01)
*G01N 27/22* (2006.01)
*G01S 7/41* (2006.01)
*G01S 13/89* (2006.01)
*G01V 3/12* (2006.01)

(52) U.S. Cl.
CPC .............. *G01S 13/89* (2013.01); *G01V 3/12* (2013.01); *G06V 10/42* (2022.01); *G06V 10/82* (2022.01)

(56) References Cited

U.S. PATENT DOCUMENTS

| | | | | |
|---|---|---|---|---|
| 5,835,053 | A * | 11/1998 | Davis | G01S 13/0209 342/22 |
| 5,952,561 | A * | 9/1999 | Jaselskis | G01N 33/42 73/78 |
| 9,903,077 | B2 * | 2/2018 | Rio | E01C 19/288 |
| 11,346,835 | B2 * | 5/2022 | Troxler | E01C 19/235 |
| 2002/0175691 | A1 * | 11/2002 | Sovik | G01N 33/42 324/654 |
| 2004/0032269 | A1 * | 2/2004 | Sovik | G01N 33/42 324/663 |
| 2006/0106546 | A1 * | 5/2006 | Roberts | G01N 22/04 702/27 |
| 2013/0018575 | A1 * | 1/2013 | Birken | G01S 13/00 701/514 |
| 2015/0268218 | A1 * | 9/2015 | Troxler | G01N 9/24 342/21 |
| 2017/0115114 | A1 * | 4/2017 | Birken | G01B 11/2513 |
| 2019/0094202 | A1 * | 3/2019 | Troxler | G01S 13/885 |
| 2019/0154442 | A1 | 5/2019 | Annovi et al. | |
| 2019/0301109 | A1 * | 10/2019 | Roberts | G01S 13/885 |
| 2019/0339209 | A1 * | 11/2019 | Du | G01N 33/42 |
| 2021/0141080 | A1 * | 5/2021 | Oetken | G06T 7/514 |

FOREIGN PATENT DOCUMENTS

| | | |
|---|---|---|
| CN | 111025285 A | 4/2020 |
| CN | 111025286 A | 4/2020 |

OTHER PUBLICATIONS

Xu Xin-Jun, et al., Research on Early Warning Model of Roadbed Diseases under Urban Roads Based on GPR and Probabilistic Neural Network, Science Technology and Engineering, 2017, pp. 118-124, vol. 17 No. 17.

Li, Fabin, et al., Research on Rapid and Comprehensive Detection System for Urban Roadbed Diseases, Highway Transportation Science and Technology (Applied Technology Edition), 2019, pp. 30-34, No. 2.

* cited by examiner

METHOD FOR DETECTING MOISTURE DAMAGE ON ASPHALT PAVEMENT BASED ON ADAPTIVE SELECTION OF GPR IMAGE GRAYSCALE

CROSS REFERENCE TO THE RELATED APPLICATIONS

This application is the national phase entry of International Application No. PCT/CN2020/136765, filed on Dec. 16, 2020, which is based upon and claims priority to Chinese Patent Application No. 201911059030.9, filed on Nov. 1, 2019, the entire contents of which are incorporated herein by reference.

TECHNICAL FIELD

The present invention belongs to the field of road maintenance, and relates to moisture damage on an asphalt pavement, and more particularly, to a method for detecting moisture damage on an asphalt pavement based on adaptive selection of a ground penetrating radar (GPR) image grayscale.

BACKGROUND

As an instrument that uses a radar pulse wave to detect and capture images of conditions below the ground surface, a GPR uses an antenna to transmit and receive a high-frequency electromagnetic wave to detect material properties inside a medium. The GPR transmits the electromagnetic wave into the ground surface by using a high-frequency and usually polarized radio wave. When the electromagnetic wave hits an object buried under the ground surface or reaches a change boundary of dielectric constant, a reflected wave received by the antenna records a signal difference of the reflection echo. Contributing to the support for continuous, quick and nondestructive detection, the GPR has been widely applied in highway traffic, such as recognition of a tunnel substrate void, a pavement void, an underground pipeline, and a dowel bar or a reinforcement bar of a building or a bridge deck. However, it is difficult to interpret GPR imaging. Therefore, a GPR image is interpreted mainly depending on experience of GPR experts, which limits an application scope of the GPR.

A convolutional neural network (CNN) is a deep learning method, and has been widely applied in image classification and image pattern recognition. Through transfer learning (TL), a model (shared network layer weights) obtained through training based on a large quantity of samples can be used for a small sample for model training, thereby promoting influence of the CNN in the GPR field. At present, there have been studies on application of various CNN models (for example, Faster CNN) and GPR methods in automatic detection of reinforcement bars of bridge decks as well as pavement cracks. However, the existing studies are targeted at the GPR image (also named B-Scan) target detection method based on a hyperbolic feature, which focuses on extracting and positioning the hyperbolic feature and is suitable for detection of isolated targets such as reinforcement bars, dowel bars, and cracks. These studies have achieved desired results.

Moisture damage is one of main causes of an early damage to an asphalt pavement, and is also a main and most harmful damage. Under the action of vehicle load, dynamic water pressure will be generated in a moisture damage region. For the asphalt surface course in the moisture damage region, under the repeated action of pore water pressure, in an early stage of the moisture damage, an asphalt film will peel off from an aggregate surface, and aggregates in a mixture will lose their bonding force to become soft gradually and even finally loose, resulting in a pitted surface and looseness; and in a later stage of the moisture damage, aggregated particles in a local loose place fall off gradually and are washed away, and pits of different sizes are formed. Seriously affected by the moisture damage, large-scale pits are easy to break out after the rainy season in hot and rainy regions of southern China, which seriously affects the safety of vehicles while in operation. Therefore, positioning the moisture damage quickly and accurately is of great significance for the maintenance of a pavement and prolonging a service life of the pavement.

The GPR is an effective moisture damage detection means, but the existing dielectric constant test method based on a GPR electromagnetic wave cannot accurately position the moisture damage region and its depth. Therefore, it is still difficult to accurately detect the moisture damage. The invention patent (a moisture damage recognition method based on a time frequency statistical feature of a GPR signal, 20191010046.3) proposed by the inventor realizes detection and automatic analysis of the moisture damage based on GPR data through machine learning, but does not consider the impact of a bridge joint on a bridge deck pavement. The GPR image can be effectively used to determine the moisture damage. However, a feature of the moisture damage is obviously different from the existing hyperbolic feature. Therefore, it is greatly desired to establish an automatic recognition method for a GPR image of the moisture damage to achieve more intelligent GPR detection, and provide an effective detection method for intelligent maintenance of a pavement.

SUMMARY

The present invention aims to provide a method for detecting a moisture damage on an asphalt pavement based on adaptive selection of a GPR image grayscale, to resolve a technical problem that it is difficult to automatically detect a moisture damage on an asphalt pavement in the prior art.

To achieve the objective, the present invention provides the following solutions:

A method for detecting a moisture damage on an asphalt pavement based on adaptive selection of a GPR image grayscale includes the following steps:
 step 1: obtaining a moisture damage GPR image dataset through pavement investigation by using a ground penetrating radar (GPR), specifically including:
  step S11: performing the asphalt pavement investigation and data collection by using the GPR: performing on-site data collection on the asphalt pavement by using a GPR system, and during the on-site data collection, labeling a damage region in which mud-pumping or whitening or stripping occurs on the pavement in data collection software; and
  step S12: obtaining an initial GPR image dataset of the moisture damage: after preprocessing GPR data corresponding to the damage region, selecting a GPR image with an appropriate plot scale, intercepting the GPR image according to a length of 5 m to 6 m, constructing initial GPR image datasets of the moisture damage, a bridge joint, and normal asphalt pavement, and labeling respective features of the moisture damage, the bridge joint, and the normal asphalt pavement.

The GPR image with the appropriate plot scale is selected according to an adaptive GPR image selection method; and the adaptive GPR image selection method adaptively selects a GPR image based on a plot scale of the GPR image, and includes the followings steps:

step (1): reading preprocessed GPR data:
after preprocessing the GPR data, randomly generating GPR images with different plot scales within a set plot scale range, and constructing an initial random GPR image dataset, where the initial random GPR image dataset includes N images;

step (2): adjusting image resolution:
defining the initial random GPR image dataset as an RID dataset, scaling the RID dataset directly to 224×224, and defining the scaled dataset as an RBD dataset; and
scaling a resolution of the initial GPR image dataset of the moisture damage directly to 224×224 to obtain the RBD dataset;

step (3): inputting dataset into a recognition model:
inputting the RBD dataset obtained in step 2 into the recognition model, performing operation by the recognition model, and then performing step 4, where
the recognition model is identical to a recognition model in step 3;

step (4): outputting a moisture damage result:
performing post-processing on an output result of the recognition model in step 3, where the post-processing is identical to post-processing in step 4, and the output result is a GPR image with a label name of a target and a position (x, y, w, h) of a candidate box BBox corresponding to the target;

step (5): determining, by using the initial random GPR image dataset, whether a detection target exists:
step S51: converting the output result in step 4 into a matrix $A_i$ corresponding to pixels on an image, where $A_i$, is defined as follows:

$$A_i[m, n] = \begin{cases} 1, & x_i \le m \le x_i + W_i \text{ and } y_i \le n \le y_i + h_i \\ 0, & \text{other} \end{cases},$$

where $1 \le m \le H_0, 1 \le n \le W_0$, where $H_0$ represents an image height of the image output by the recognition model, and $W_0$ represents an image width of the image output by the recognition model; and
performing sum on matrices $A_i$ corresponding to N images in the RID dataset, and averaging the matrices $A_i$ to obtain a mean matrix A, where A is defined as:

$$A = \frac{1}{N}\sum_{i=1}^{N} A_i;$$

and
step S52: setting $k_1=0.8$ and $\theta_0=0.5$, and updating the mean matrix A according to the following formula to obtain an updated mean matrix A:

$$A(A < \max(k_1 * \max(\max(A)), \theta_0)) = 0,$$

where,
$k_1$ represents a target correlation coefficient;

$\theta_0$ represents a minimum value in the matrix A when the target exists, where the target does not exist when a value is less than the minimum value; and
max(max(A)) represents a maximum value in the mean matrix; and step S53: based on the updated mean matrix A according to the following formula, obtaining a condition T for determining whether the target exists, where the target exists when T=1, and the target does not exist when T=0:

$$T = \begin{cases} 1, & \text{where } \max(\max(A)) > 0 \\ 0, & \text{where } \max(\max(A)) = 0 \end{cases};$$

and
step (6): randomly generating images incrementally, and selecting the image with the appropriate plot scale:
when the target exists in the image, performing initial determining:
step S61: if Flag=0, indicating that a random GPR image sample set is generated for a first time, in other words, a sample set initialization stage is currently available and no determining for subsequent selection is performed, setting Flag=1, adding 5% of N images as samples of the random GPR image dataset, and returning to step (2), where a total quantity of images in the sample set is N=(1+5%)N; or
step S62: if Flag≈0, indicating that a non-initialization stage is currently available, setting an image correlation coefficient, and selecting an image having a maximum correlation coefficient with the mean matrix A to be the image with the appropriate plot scale, where
the correlation coefficient $R_i$, is defined as follows:

$$R_i = \frac{\sum_{m=1}^{H_0}\sum_{n=1}^{W_0}(A(m, n) - \mu_A)(A_i(m, n) - \mu_{A_i})}{\sqrt{\sum_{m=1}^{H_0}\sum_{n=1}^{W_0}(A(m, n) - \mu_A)^2 \sum_{m=1}^{H_0}\sum_{n=1}^{W_0}(A_i(m, n) - \mu_{A_i})^2}},$$

where $R_i$ represents a correlation coefficient between a matrix $A_i$ corresponding to an $i^{th}$ image and the mean matrix A, m represents a coordinate value in a height direction, n represents a coordinate value in a width direction, $\mu_A$ represents a grand mean of the mean matrix A, and $\mu_{A_i}$ represents a grand mean of the matrix $A_i$;
a stop condition for the selection process is as follows:

$$STOP = abs(F1 - F1_{pre}) < 0.01 \text{ \&\& } F1 > 0.8,$$

$$F1 = 2 * \frac{Precision \cdot Recall}{Precision + Recall},$$

$$Precision = \frac{TP}{TP + FP},$$

$$Recall = \frac{TP}{TP + FN},$$

where F1 represents an evaluation indicator of a deep learning; $F1_{Pre}$ represents an evaluation indicator of a previous deep learning, and is initially set to 0; TP represents a true target region, FP represents a falsely recognized ground truth, and indicates that an unrecognized ground truth is falsely determined as a negative value or a background; and FN represents a falsely recognized negative value, and indicates that the background is recognized as the target;

when the stop condition is not met, the variable $F1_{Pre}$ is set to a currently calculated indicator F1, then step S61 is returned, and the sample set is expanded to perform re-selection;

when the stop condition is met, a system outputs the image with the appropriate plot scale.

The present invention further has the following technical features:

step 2: adjusting the image resolution:
  defining the initial GPR image dataset of the damage as an ID dataset, scaling the ID dataset directly to 224×224, and defining a scaled dataset as a BD dataset; and
  scaling a resolution of the initial GPR image dataset of the damage directly to 224×224 to obtain the BD dataset;

step 3: inputting dataset into the recognition model, including:
  inputting the BD dataset obtained in step 2 into the recognition model, performing operation by the recognition model, and then performing step 4, where an input image resolution of the recognition model is 224×224, and an output image resolution is 224×224; and
  the recognition model is a mixed deep learning model, and the mixed deep learning model is composed of two parts: ResNet50 for feature extraction, and YOLO V2 framework for target detection;

step 4: outputting the moisture damage result:
  performing the post-processing on the output result of the recognition model in step 3, where the post-processing includes:
    step S41: determining a quantity of candidate boxes BBoxes in an image in the output result, and performing step S42 if the quantity of the candidate boxes BBoxes is greater than 1, or directly outputting a result if the quantity of candidate boxes BBoxes is less than or equal to 1;
    step S42: determining whether the candidate boxes BBoxes overlap, and performing step S43 if the candidate boxes BBoxes overlap, or directly outputting the result if the candidate boxes BBoxes do not overlap;
    step S43: determining whether label names corresponding to overlapped candidate boxes BBoxes are identical, where if the label names corresponding to the overlapped candidate boxes BBoxes are identical, a label name corresponding to a combined candidate box BBox maintains unchanged; if the label names corresponding to the overlapped candidate boxes BBoxes are different, it indicates that two types of label names respectively corresponding to the moisture damage and the bridge joint simultaneously exist, and an output label name is Joint;
    step S44: combining the candidate boxes BBoxes by taking minimum values of w and y and maximum values of w and h of the overlapped candidate boxes BBoxes, where coordinates of a combined candidate box BBox are [$x_{min}$, $y_{min}$, $w_{max}$, $h_{max}$]; and
    step S45: outputting the result, where in the output result of the recognition model, the output image resolution is adjusted to the image resolution of the initial GPR image dataset of the damage, and the output result is the image with the label name of the target and the position (x, y, w, h) of the candidate box BBox corresponding to the target.

The present invention further has the following technical features:

In step S11, during the on-site data collection, a sampling spacing is <15 cm, an antenna frequency is >1.6 GHz, and a sampling frequency is 10 to 20 times an antenna central frequency.

In step S12, the preprocessing is performed by using a direct current (DC) drift correction algorithm, a ground correction algorithm, a background subtraction algorithm, a band-pass filtering algorithm, and a moving average algorithm.

In step S12, the plot scale of the GPR image is set to 1.2 to 1.6.

The image resolution of the initial GPR image dataset of the damage is 1090×300.

The set plot scale range is 0.5 to 1.8.

N=100.

The present invention further provides a method for detecting a moisture damage on an asphalt pavement based on adaptive selection of a GPR image grayscale, where the detection method includes the following steps:
  based on GPR data of the asphalt pavement, determining a region in which mud-pumping or whitening or stripping occurs on the pavement as a damage region;
  selecting a GPR image with an appropriate plot scale from the GPR data of the damage region by using an adaptive GPR image selection method, and establishing an initial GPR image dataset of the damage region;
  scaling a resolution of image data in the initial GPR image dataset to 224×224 to obtain a GPR image dataset with an adjusted resolution;
  inputting the GPR image dataset with the adjusted resolution into a recognition model, and obtaining an output result of the recognition model; and
  determining a moisture damage result based on the output result of the recognition model.

Compared with the prior art, the present invention has the following technical effects:

(I) The present invention resolves a problem of relying on manual experience to select a suitable image in existing GPR data analysis, and effectively combines a GPR image detection model (such as a deep model), to realize automatic GPR image selection and recognition for each piece of GPR data, and truly realize automatic and intelligent target detection based on the GPR.

(II) The present invention breaks through existing automatic detection focusing on detection of a target with a hyperbolic feature in the GPR field, realizes automatic detection of a moisture damage on an asphalt pavement with complex target features, and can provide a basis for accurate pre-maintenance of the asphalt pavement and automatic positioning of the moisture damage.

(III) The present invention considers impact of image resolution scaling, and uses the mixed model to automatically detect the moisture damage. Therefore, different from existing moisture damage recognition depending on experts' experience, the automatic detection in the present invention is not time-consuming or laborious, and is not affected by human factors.

(IV) The training sample sets in the present invention are all from on-site test data, and the samples are widely representative, thereby resolving a problem that the samples are not representative in the dataset synthesized by FDTD simulation software in the existing GPR field, and breaking through a limitation that the automatic recognition in the GPR field only focuses on the automatic detection of the hyperbolic feature.

(V) The method provided in the present invention can realize automatic detection and accurate positioning of the moisture damage, and therefore, can provide a recognition model for later automatic detection based on an unmanned inspection vehicle, to realize regular detection and inspection of the defect region, and further realize accurate maintenance and intelligent maintenance.

(VI) Based on the idea of particle filtering method, to-be-detected GPR data is read, and GPR images with different plot scales are randomly generated to construct a random dataset. The generated GPR images are input into the recognition model, a threshold is specified based on a global statistical result to find an appropriate image, and consistency between two found appropriate GPR image is used as a determining condition. If the stop condition is not met, the random sample image is continuously expanded. Such a search covers images with all possible plot scales, so that an appropriate B-scan image can be found quickly and effectively, thereby realizing automatic selection of an appropriate GPR image, and laying a foundation for automatic recognition of the GPR image.

(VII) The recognition algorithm in the present invention is combined with the deep learning model (or image classification model) to effectively, quickly and automatically find the appropriate B-scan image, to realize automatic recognition and detection based on the GPR image, and improve recognition precision.

(VIII) It is verified through experiments that the method and the YOLO-based moisture damage detection model provided in the present invention generate the appropriate GPR image based on original GPR data, and then automatically detect the moisture damage, thereby detecting the moisture damage on the asphalt pavement more intelligently.

BRIEF DESCRIPTION OF THE DRAWINGS

To describe the technical solutions in the embodiments of the present invention or in the prior art more clearly, the accompanying drawings required for the embodiments are briefly described below. Apparently, the accompanying drawings in the following description show merely some embodiments of the present invention, and a person of ordinary skill in the art may still derive other accompanying drawings from these accompanying drawings without creative efforts.

Figure 1:
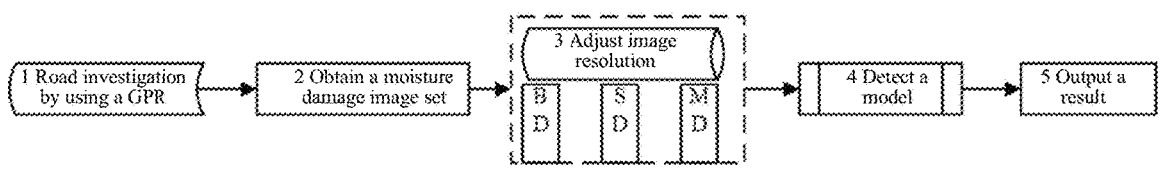
FIG. 1 is a flowchart of a method for detecting a moisture damage based on a GPR.

Reference numerals in the figures: 1-1: GPR image corresponding to an appropriate plot scale; 1-2: GPR image corresponding to a too small plot scale; 1-3: GPR image corresponding to a too large plot scale; 1-4: real moisture damage range in a GPR image corresponding to an appropriate plot scale.

DETAILED DESCRIPTION OF THE EMBODIMENTS

The technical solutions in the embodiments of the present invention are clearly and completely described below with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The present invention aims to provide a method for detecting a moisture damage on an asphalt pavement based on adaptive selection of a GPR image grayscale, to resolve a technical problem that it is difficult to automatically detect a moisture damage on an asphalt pavement in the prior art.

To make the objectives, features, and advantages of the present invention more obvious and comprehensive, the following further describes in detail the present invention with reference to the accompanying drawings and specific implementations.

Figure 8:
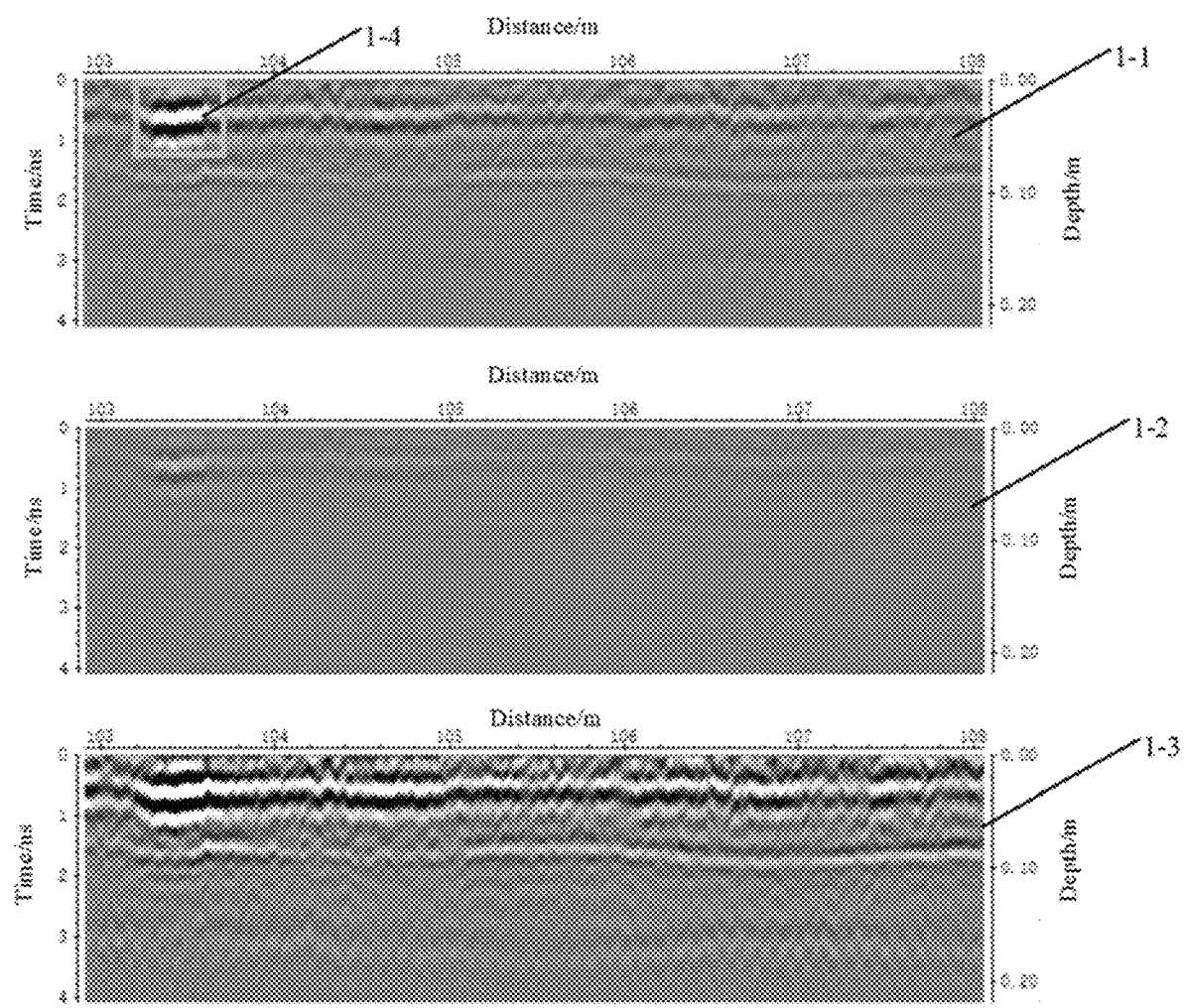
FIG. 8 shows GPR images corresponding to different plot scales.

Reason for impact of a plot scale on a GPR image: An asphalt pavement is investigated based on a GPR setting to obtain radar data, the radar data is post-processed to increase a difference between a target and a background, and then processed radar data is converted into the GPR image. FIG. 8 shows GPR images corresponding to different plot scales, where 1-1 represents a GPR image corresponding to an appropriate plot scale (or contrast) value, and 1-4 represents a moisture damage range detected based on the GPR data. 1-2 represents a GPR image corresponding to a too small plot scale value, but a defect feature of the corresponding region represented by 1-4 is not prominent on the image represented by 1-2 and is not easy to be recognized by a GPR expert or a model. 1-3 represents a GPR image corresponding to a too large plot scale. In the GPR image, the corresponding region represented by 1-4 is displayed as a moisture damage, and other regions with normal asphalt pavements are also highlighted and will be falsely determined as defect regions. It can be seen from the analysis in FIG. 8 that the appropriate plot scale is very important for recognizing a target in the GPR image.

Specific embodiments of the present invention are given below. It should be noted that the present invention is not limited to the following specific embodiments, and all equivalent transformations based on the technical solutions of the present invention fall into the protection scope of the present invention.

Embodiment 1

Figure 2:
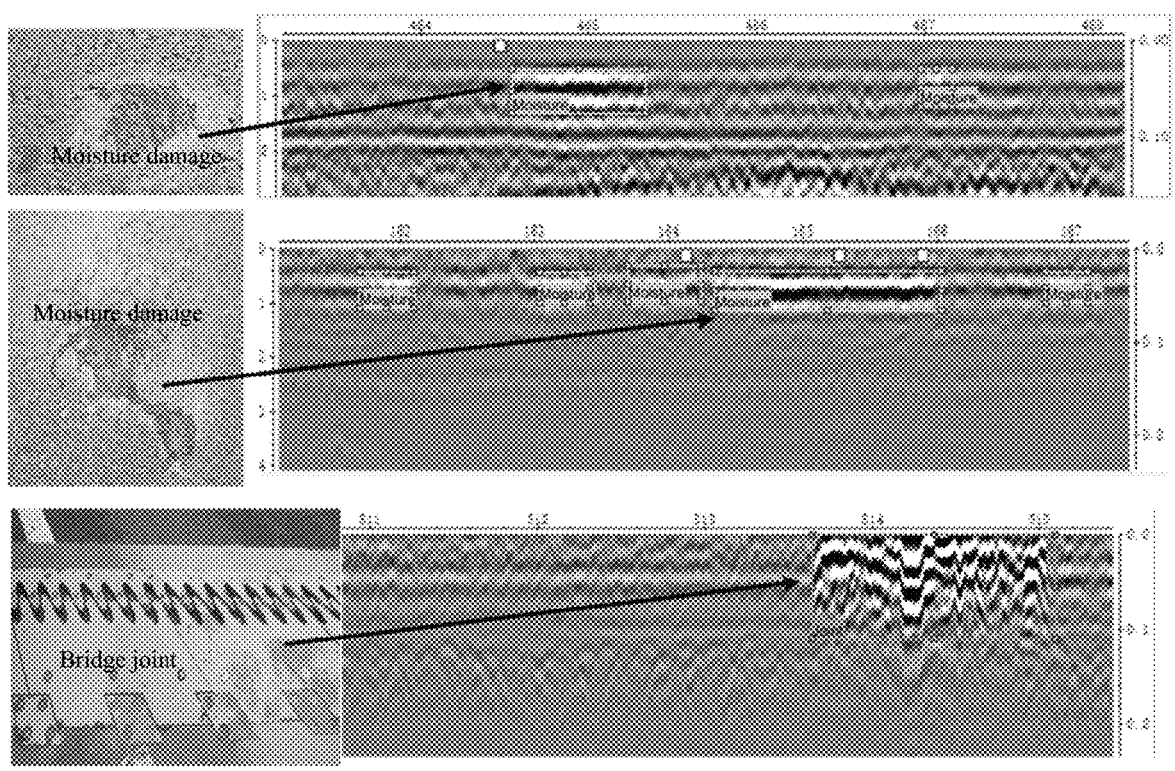
FIG. 2 is a typical GPR image feature of a moisture damage dataset.
Figure 3:
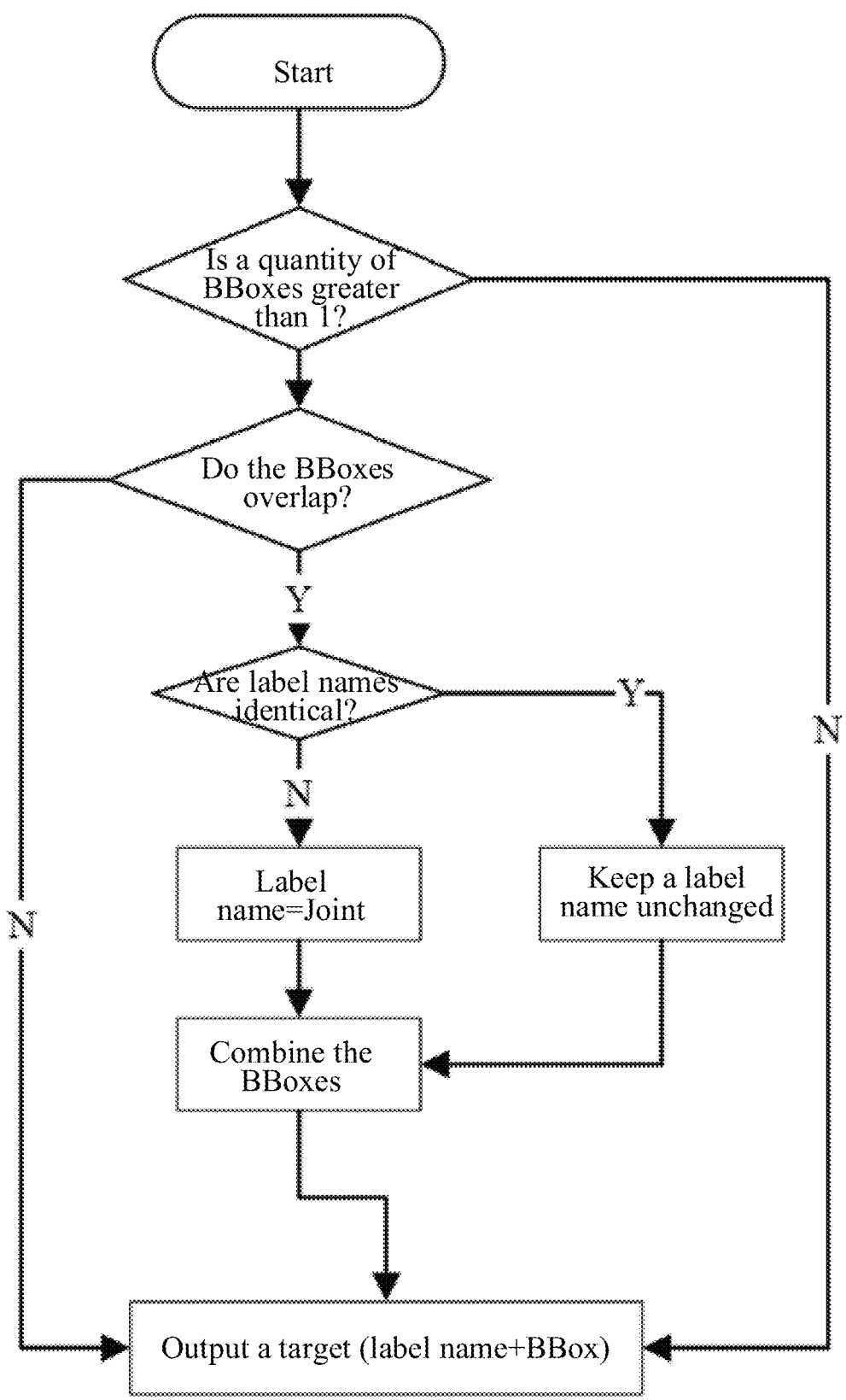
FIG. 3 is a flowchart of post-processing a result of a recognition model.

This embodiment provides a method for detecting a moisture damage on an asphalt pavement. As shown in FIG. 1 to FIG. 3, the method includes the following steps:

Step 1: Obtain a moisture damage GPR image dataset through asphalt pavement investigation by using a GPR. This step specifically includes the following substeps:

Step S11: Perform asphalt pavement investigation and data collection by using the GPR: Perform on-site data collection on an asphalt pavement by using a GPR system, and during the on-site data collection, determine a damage region in which mud-pumping or whitening or stripping occurs on the pavement.

In step S11, during the on-site data collection, a sampling spacing is <15 cm, an antenna frequency is >1.6 GHz, and a sampling frequency is 10 to 20 times an antenna central frequency.

These labels will appear in a form of a small square in an upper part of a GPR image, such as the label "☐" in the image in FIG. 2, and a moisture damage region is below these labels. The GPR image corresponding to these labels is used as a ground truth of the moisture damage to determine a feature of the moisture damage.

Step S12: Obtain an initial GPR image dataset of moisture damage: After preprocessing GPR data corresponding to the damage region, specify a plot scale of the GPR image, intercept the GPR image according to a length of 5 m to 6 m, construct initial GPR image datasets of the moisture damage, a bridge joint, and a normal asphalt pavement, and label respective features of the moisture damage, the bridge joint, and the normal asphalt pavement.

The image resolution of the initial GPR image dataset of the damage is 1090×00.

In step S12, the preprocessing is performed by using a DC drift correction algorithm, a ground correction algorithm, a background subtraction algorithm, a band-pass filtering algorithm, and a moving average algorithm.

In step S12, the specified plot scale of the GPR image is 1.2 to 1.6, preferably 1.4 in this embodiment.

FIG. 2 is a typical image of a moisture damage dataset. On the left is an on-site photo, and on the right is a corresponding GPR image. In the figure, Moisture represents the moisture damage, and Joint represents the bridge joint.

The moisture damage GPR image dataset is obtained as follows: When passing through the moisture damage region, a GPR antenna makes a label in data collection software. Through a large quantity of instance investigations, main features of the moisture damage are determined, including:

1) There are continuous or discontinuous highlighted regions at an asphalt layer.

2) A region width/height ratio of the image is uncertain, and is positively correlated with severity of the moisture damage.

The image at the bottom of FIG. 2 is a GPR image of the bridge joint, and the bridge joint is characterized by a continuous highlighted region from the pavement down. Different from the highlighted region of the moisture damage, the highlighted region of the bridge joint has the following features:

1) The highlighted region is presented from the pavement down, with hyperbolic features on both sides.

2) The highlighted region is continuous, with a depth from the surface to the bottom ≥0.1 m.

3) The region width/height ratio of image is less than 4 and area is greater than 10000 pixel$^2$.

Step 2: Adjust the image resolution.

It is found through research that accuracy of GPR images with different resolution in a recognition model is different, and the image resolution directly affects a recognition performance of the model.

The initial GPR image dataset of the moisture damage is defined as an ID dataset, the ID dataset is scaled directly to 224×224, and a scaled dataset is defined as a BD dataset.

The resolution of the initial GPR image dataset of the moisture damage is scaled directly to 224×224 to obtain the BD dataset.

Step 3: Input the dataset into the recognition model. This step specifically includes the following substep:

inputting the BD dataset obtained in step 2 into the recognition model, performing operation by the recognition model, and then performing step 4.

Input image resolution of the recognition model is 224×224, and output image resolution is 224×224.

The recognition model is a mixed deep learning model, and the mixed deep learning model is composed of two parts: ResNet50 for feature extraction, and YOLO V2 framework for target detection.

Both the ResNet50 and the YOLO V2 framework are known deep learning models.

The feature extraction is composed of four stages, to realize 16-times down sampling and convert 224×224 into 14×14×1024 to provide original CNN data for subsequent YOLO-based detection.

In the YOLO v2 framework, a target detection box and a candidate box BBox are provided, Grid is set to 14×14 for YOLO Class Conv, and Anchor boxes is set to 6. In YOLO Transform, a loss function is set to MSE.

The mixed deep learning model divides image data obtained in step 2 into a training set and a test set with allocation ratios being 70% and 30% respectively. The designed mixed deep learning model is specifically trained by using a TL method. The model uses the MSE method as the loss function, and the quantity of anchor boxes is obtained by classifying heights/widths of a moisture damage and a bridge joint in a sample set according to the K-means method.

The mixed deep learning model uses indicators F1, Recall, and Precision to measure performance of the model.

Step 4: Output a moisture damage result.

Overlapping exists in the result output by the recognition model, including:

1) A plurality of prediction results that overlap each other are available for a long moisture damage.

2) Some bridge joints have a plurality of results, and are falsely determined as moisture damages.

For this purpose, FIG. 3 is a flowchart of post-processing a GPR image with coordinate axes.

An output result of the recognition model in step 3 is post-processed. The post-processing step includes the following substeps:

Step S41: Determine a quantity of candidate boxes BBoxes in an image in the output result, and perform step S42 if the quantity of candidate boxes BBoxes is greater than 1, or directly output the result if the quantity of candidate boxes BBoxes is less than or equal to 1.

Step S42: Determine whether the candidate boxes BBoxes overlap, and perform step S43 if the candidate boxes BBoxes overlap, or directly output the result if the candidate boxes BBoxes do not overlap.

Step S43: Determine whether label names corresponding to overlapped candidate boxes BBoxes are identical, where if the label names corresponding to the overlapped candidate boxes BBoxes are identical, a label name corresponding to a combined candidate box BBox maintains unchanged; if the label names corresponding to the overlapped candidate boxes BBoxes are different, it indicates that two types of label names respectively corresponding to the moisture damage and the bridge joint simultaneously exist, and an output label name is Joint.

Step S44: Combine the overlapped candidate boxes BBoxes by taking minimum values of x and y the overlapped candidate boxes BBoxes and maximum values of w and h the overlapped candidate boxes BBoxes, where coordinates of the combined candidate box BBox are me [$x_{min}$, $y_{min}$, $w_{max}$, $h_{max}$].

Step S45: Output the result, where in the output result of the recognition model, the output image resolution is adjusted to the image resolution of the initial GPR image dataset of the damage, and the output result is an image with a label name of a target and a position (x, y, w, h) of a candidate box BBox corresponding to the target.

Comparative Embodiment 1

This comparative embodiment provides a method for detecting a moisture damage on an asphalt pavement. Other steps of the method are the same as those in Embodiment 1, except that step 2 and an image input in step 3 are different.

Step 2: Adjust the image resolution.

The initial GPR image dataset of the damage is defined as an ID dataset, the original images in ID dataset were cropped to 224×224 equally sized images as a Small dataset (SD, only the images with targets were remained) with high resolution.

The initial GPR image dataset of the damage is cropped to 224×224 size to obtain the SD dataset.

Comparative Embodiment 2

This comparative embodiment provides a method for detecting a moisture damage on an asphalt pavement. Other steps of the method are the same as those in Embodiment 1, except that step 2 and an image input in step 3 are different.

Step 2: Adjust the image resolution.

The initial GPR image dataset of the damage is defined as an ID dataset, and the ID dataset is cropped to 224×224 equally sized images. An image constructed based on cropped images including the moisture damage and the bridge joint is defined as an SD dataset. And mixed dataset (defined as MD) was created by the combined dataset of BD and SD.

The resolution of the initial GPR image dataset of the damage is adjusted to obtain the MD dataset.

Figure 4:
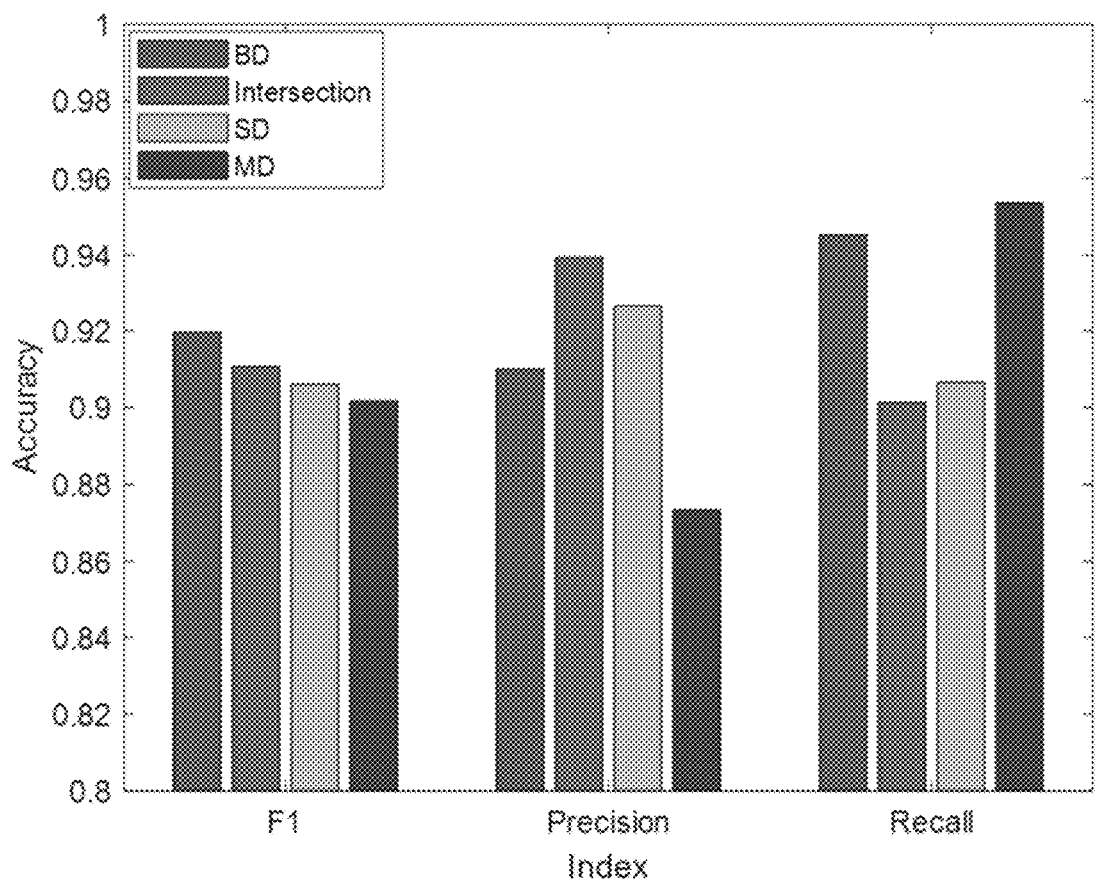
FIG. 4 compares indicators of a mixed model under different resolution datasets.

Comparative analysis is performed on Embodiment 1, Comparative Embodiment 1, and Comparative Embodiment 2. An original GPR image dataset including 1,431 images is constructed based on the algorithm in the present invention, and the BD, SD, and MD datasets are constructed based on the algorithm. FIG. 4 shows a result of a training model. It can be seen from the figure that a network obtained by training the proposed mixed deep model on each dataset achieves a desired result in a test set, and this indicates that the proposed mixed deep model is feasible. A model obtained through training on the BD dataset is optimal, with F1 being 91.97%, Recall being 94.53%, and Precision being 91.00%. Therefore, in the present invention, the BD model is selected as the training model, and a preferable resolution scaling method is to directly scale the original image in an equal proportion.

Comparative Embodiment 3

This comparative embodiment provides a method for detecting a moisture damage on an asphalt pavement. In this method, an ACF algorithm is used to detect a moisture damage on an asphalt pavement.

Comparative Embodiment 4

This comparative embodiment provides a method for detecting a moisture damage on an asphalt pavement. In this method, a Cifar10 model is used to detect a moisture damage on an asphalt pavement.

Figure 5:
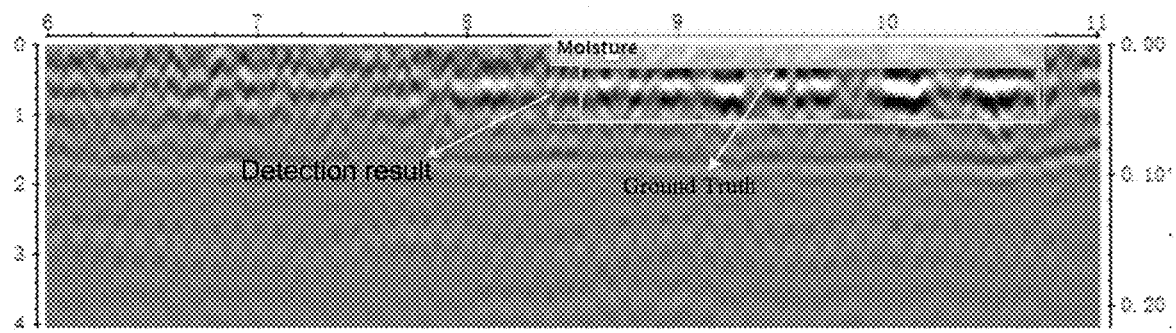
FIG. 5 shows a moisture damage detection result obtained by using a mixed model.
Figure 6:
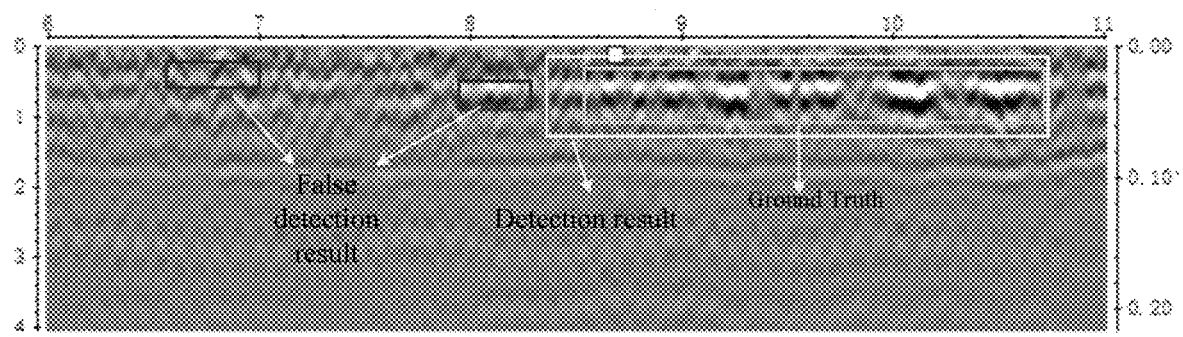
FIG. 6 shows a detection result obtained by using an aggregate channel features (ACF) algorithm.
Figure 7:
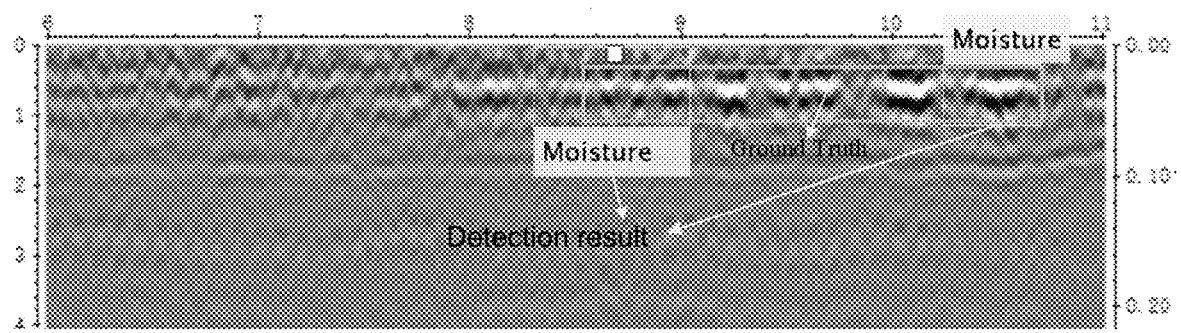
FIG. 7 shows a detection result obtained by using a Cifar10 model.

Comparative analysis is performed on Embodiment 1, Comparative Embodiment 3, and Comparative Embodiment 4. FIG. 5 to FIG. 7 compare results obtained by using the proposed deep model, the ACF algorithm, and the Cifar10 model. In the figures, Ground Truth represents a ground truth of the moisture damage. Through comparison, it is found that there are redundant detection regions or a large quantity of missed detection regions when the ACF algorithm and the Cifar10 model are used, and this further verifies accuracy of the method in the present invention.

Embodiment 2

Figure 9:
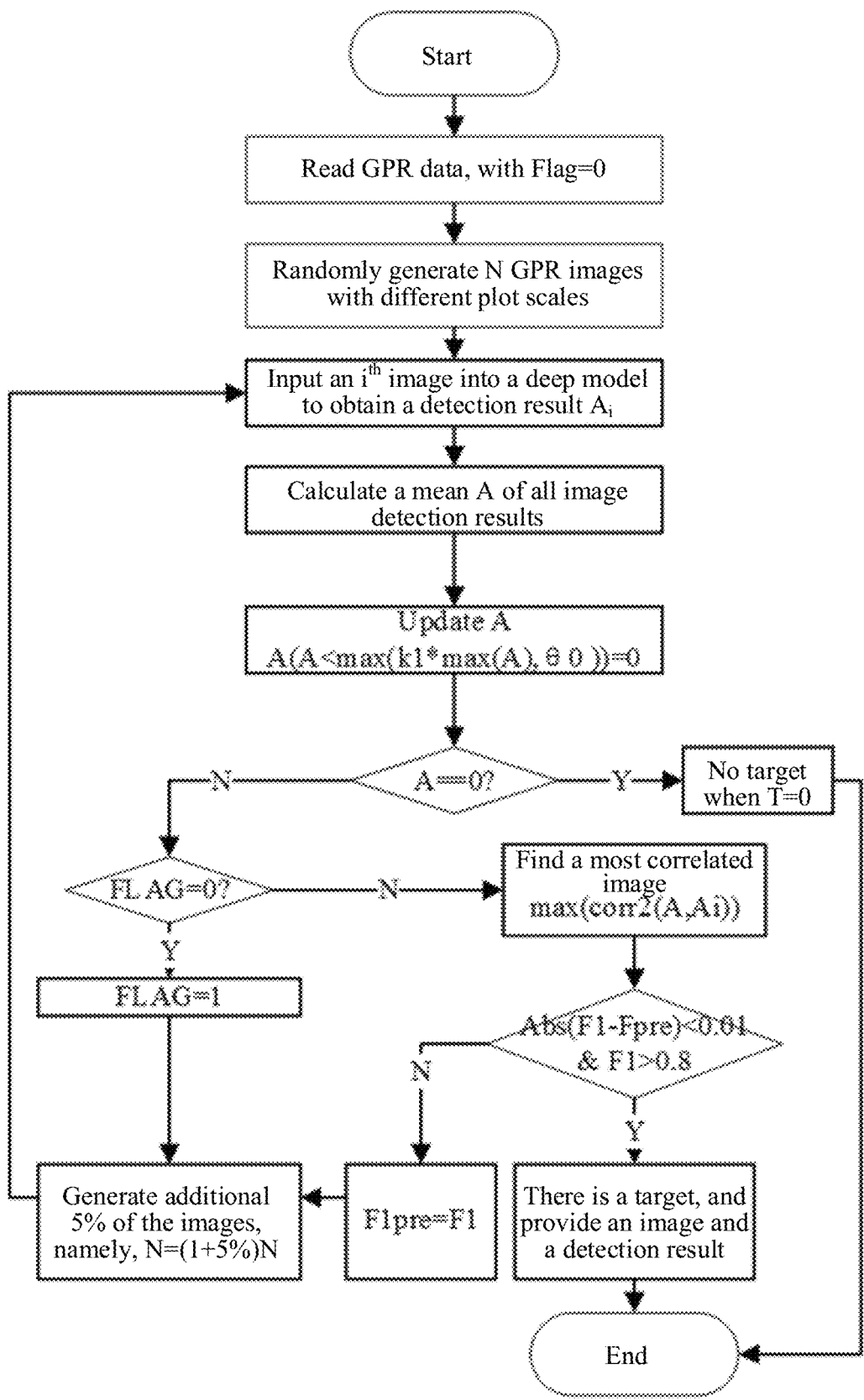
FIG. 9 is an algorithm of recognizing a GPR image with an appropriate plot scale.

This embodiment provides an adaptive GPR image selection method used for moisture damage detection. As shown in FIG. 9, in this method, a GPR image is adaptively selected based on a plot scale of the GPR image. This method includes the following steps:

Step 1: Read preprocessed GPR data.

After GPR data is preprocessed, GPR images with different plot scales are randomly generated within a set plot scale range, and an initial random GPR image dataset is constructed. The initial random GPR image dataset includes N images, and is used to determine whether a target exists.

A method for obtaining the GPR data includes performing on-site data collection on an asphalt pavement by using a GPR system, and during the on-site data collection, determining a damage region in which mud-pumping or whitening or stripping occurs on the pavement, to obtain the GPR data corresponding to the damage region.

during the on-site data collection, a sampling spacing is <15 cm, an antenna frequency is >1.6 GHz, and a sampling frequency is 10 to 20 times an antenna central frequency.

The preprocessing is performed by using a DC drift correction algorithm, a ground correction algorithm, a background subtraction algorithm, a band-pass filtering algorithm, and a moving average algorithm.

The set plot scale range is 0.5 to 1.8.

N=100.

Step 2: Adjust image resolution.

It is found through research that accuracy of images with different resolution in a recognition model is different, and the image resolution directly affects a recognition effect of the model.

The initial random GPR image dataset is defined as an RID dataset, the RID dataset is scaled directly to 224×224, and a scaled dataset is defined as an RBD dataset.

Resolution of an initial GPR image dataset of a moisture damage is scaled directly to 224×224 to obtain the RBD dataset.

Step 3: Input the dataset into the recognition model.

The RBD dataset obtained in step 2 is input into the recognition model, operation is performed by using the recognition model, and then step 4 is performed.

Input image resolution of the recognition model is 224×224, and output image resolution is 224×224.

The recognition model is a mixed deep learning model, and the mixed deep learning model is composed of two parts: ResNet50 for feature extraction, and YOLO V2 framework for target detection.

Both the ResNet50 and the YOLO V2 framework are known deep learning models.

The feature extraction is composed of four stages, to realize 16-times down sampling and convert 224×224 into 14×14×1024 to provide original CNN data for subsequent YOLO-based detection.

In the YOLO v2 framework, a target detection box and a candidate box BBox are provided, Grid is set to 14×14 for YOLO Class Conv, and Anchor boxes is set to 6. In YOLO Transform, a loss function is set to MSE.

The mixed deep learning model divides an image obtained in step 2 into a training set and a test set with allocation ratios being 70% and 30% respectively. The designed mixed deep learning model is specifically trained by using a TL(transfer learning) method. The model uses the MSE(Mean Squared Error) method as the loss function, and the quantity of anchor boxes is obtained by classifying heights/widths of a moisture damage and a bridge joint in a sample set according to the K-means method.

The mixed deep learning model uses indicators F1, Recall, and Precision to measure performance of the model.

Step 4: Output a moisture damage result.

An output result of the recognition model in step 3 is post-processed. The post-processing step includes the following substeps:

Step S41: Determine a quantity of candidate boxes BBoxes in a GPR image in the output result, and perform step S42 if the quantity of candidate boxes BBoxes is greater than 1, or directly output the result if the quantity of candidate boxes BBoxes is less than or equal to 1.

Step S42: Determine whether the candidate boxes BBoxes overlap, and perform step S43 if the candidate boxes BBoxes overlap, or directly output the result if the candidate boxes BBoxes do not overlap.

Step S43: Determine whether label names corresponding to overlapped candidate boxes BBoxes are identical, where if the label names corresponding to the overlapped candidate boxes BBoxes are identical, a label name corresponding to a combined candidate box BBox maintains unchanged; if the label names corresponding to the overlapped candidate boxes BBoxes are different, it indicates that two types of label names respectively corresponding to the moisture damage and the bridge joint simultaneously exist, and an output label name is Joint.

Step S44: Combine the overlapped candidate boxes BBoxes by taking minimum values of x and y and maximum values of w and h of the overlapped candidate boxes BBoxes, where coordinates of the combined candidate box BBox are $[x_{min}, y_{min}, w_{max}, h_{max}]$.

Step S45: Output the result, where in the output result of the recognition model, the output image resolution is adjusted to the image resolution of the initial GPR image dataset of the damage, and the output result is an image with a label name of a target and a position (x, y, w, h) of a candidate box BBox corresponding to the target.

Step 5: Determine, by using the initial random GPR image dataset, whether the detection target exists. This step includes the following substeps:

Step S51: Convert the output result in step 4 into a matrix $A_i$ corresponding to pixels on an image, where $A_i$ is defined as follows:

$$A_i[m, n] = \begin{cases} 1, & x_i \leq m \leq x_i + W_i \text{ and } y_i \leq n \leq y_i + h_i \\ 0, & \text{other} \end{cases},$$

where $1 \leq m \leq H_0$, $1 \leq n \leq W_0$

In the above formula, $H_0$ represents an image height of the image output by the recognition model, and $W_0$ represents an image width of the image output by the recognition model.

To represent the formula more accurately, the formula $$A_i[m, n] = \begin{cases} 1, & x_i \leq m \leq x_i + W_i \text{ and } y_i \leq n \leq y_i + h_i \\ 0, & \text{other} \end{cases},$$

where $1 \leq m \leq H_0$, $1 \leq n \leq W_0$ can be replaced with the following formula:

$$A_i(m, n) = \begin{cases} 1, & x_{ij} \leq m \leq x_{ij} + W_{ij} \text{ and } y_{ij} \leq n \leq y_{ij} + h_{ij}, j = 1, 2, \ldots, J_i \\ 0, & \text{other} \end{cases},$$

where $2 \leq m \leq H_i$, $1 \leq n \leq W_i$

In the above formula, $A_i(m,n)$ represents an $(m,n)^{th}$ element in a corresponding matrix of an $i^{th}$ image with the label name of the target and the position of the candidate box BBox corresponding to the target, $(x_{ij}, y_{ij})$ represents start coordinates of a $j^{th}$ candidate box BBox in the $i^{th}$ image with the label name of the target and the position of the candidate box BBox corresponding to the target, $w_{ij}$ and $h_{ij}$ respectively represent a width and a height of the $j^{th}$ candidate box BBox in the $i^{th}$ image with the label name of the target and the position of the candidate box BBox corresponding to the target, $H_i$ represents a height of the $i^{th}$ image with the label name of the target and the position of the candidate box BBox corresponding to the target, $W_i$ represents a width of the $i^{th}$ image with the label name of the target and the position of the candidate box BBox corresponding to the target, and $J_i$ represents a quantity of candidate boxes BBoxes in the jet $i^{th}$ image with the label name of the target and the position of the candidate box BBox corresponding to the target.

Sum is performed on matrices $A_i$ corresponding to the N images in the RID dataset, and the matrices $A_i$ are averaged to obtain a mean matrix A. Mean matrix A is defined as follows:

$$A = \frac{1}{N}\sum_{i=1}^{N}A_i$$

Step S52: Because the plot scale range is optimal, the target is greatly different from a background. If the measured GPR data contains the target, output results of most GPR images should include the target region, and a value of the mean matrix A in this region is large. If the measured GPR data does not contain the target, only images corresponding to a few inappropriate plot scales include the target, and a value of the mean matrix A in this region is small.

$k_1=0.8$ and $\theta_0=0.5$ are set, and the mean matrix A is updated according to the following formula to obtain an updated mean matrix A:

$$A(A<\max(k_1 * \max(\max(A)), \theta_0)) = 0$$

In the above formula:

$k_1$ represents a target correlation coefficient, and is used to adjust a maximum mean to determine different targets;

$\theta_0$ represents a minimum value in the matrix A when the target exists, where the target does not exist when a value is less than the minimum value; and $\max(\max(A))$ represents a maximum value in the mean matrix.

The formula $A(A<\max(k_1*\max(\max(A)),\theta_0))=0$ is a matrix calculation formula. Based on the matrix A, all values less than $k_1*\max(\max(A))$, $\theta_0$ are set to 0, and the matrix A is updated. In other words, the matrix A becomes a new matrix after being calculated, and can be replaced with the following formula:

$$A'(m, n) = \begin{cases} 0 & A(m, n) < \max(k_1^* \max(\max(A)), \theta_0)) \\ A(m, n) & \text{else} \end{cases}$$

where A(m,n) represents an (m,n)th element in the mean matrix, and A'(m,n) represents an (m,n)th element in an updated mean matrix.

Step S53: Based on the updated mean matrix A according to the following formula, obtain a condition T for determining whether the target exists, where the target exists when T=1, and the target does not exist when T=0:

$$T = \begin{cases} 1, & \text{where } \max(\max(A)) > 0 \\ 0, & \text{where } \max(\max(A)) = 0 \end{cases}$$

Step 6: Randomly generate images incrementally, and select a GPR image with an appropriate plot scale.

When the target exists in the image, initial determining is performed.

Step S61: If Flag=0, it is indicated that a random image sample set is generated for the first time, in other words, a sample set initialization stage is currently available and no determining for subsequent selection is performed, set Flag=1, add 5% of N images as samples of the random GPR image dataset, and return to step (2), where a total quantity of images in the sample set is N=(1+5%)N.

Step S62: If Flag≈0, it is indicated that a non-initialization stage is currently available, set an image correlation coefficient, and select an image having a maximum correlation coefficient with the mean matrix A to be the image with the appropriate plot scale.

The correlation coefficient $R_i$ is defined as follows:

$$R_i = \frac{\sum_{m=1}^{H_0}\sum_{n=1}^{W_0}(A(m,n)-\mu_A)(A_i(m,n)-\mu_{A_i})}{\sqrt{\sum_{m=1}^{H_0}\sum_{n=1}^{W_0}(A(m,n)-\mu_A)^2 \sum_{m=1}^{H_0}\sum_{n=1}^{W_0}(A_i(m,n)-\mu_{A_i})^2}}$$

where $R_i$ represents a correlation coefficient between a matrix $A_i$ corresponding to an $i^{th}$ image and the mean matrix A, m represents a coordinate value in a height direction, n represents a coordinate value in a width direction, $\mu_A$ represents a grand mean of the mean matrix A, and $\mu_{A_i}$ represents a grand mean of the matrix $A_i$.

A stop condition for the selection process is as follows:

$$STOP = abs(F1 - F1_{pre}) < 0.01 \ \&\& \ F1 > 0.8;$$

$$F1 = 2 * \frac{Precision \cdot Recall}{Precision + Recall};$$

$$Precision = \frac{TP}{TP+FP};$$

$$Recall = \frac{TP}{TP+FN};$$

where F1 represents an evaluation indicator of a deep learning; $F1_{Pre}$ represents an evaluation indicator of a previous deep learning, and is initially set to 0; TP represents a true target region, FP represents a falsely recognized ground truth, and indicates that an unrecognized ground truth is falsely determined as a negative value or a background; and FN represents a falsely recognized negative value, and indicates that the background is recognized as the target;

When the stop condition is not met, the variable $F1_{Pre}$ is set to a currently calculated indicator F1, then step S61 is returned, and the sample set is expanded to perform re-selection.

When the stop condition is met, a system outputs the image with the appropriate plot scale.

Effect Test Comparison

An artificially constructed moisture damage GPR image dataset is used, the deep learning model is obtained through training by using the YOLO detection framework and the TL method, and recognition is performed in combination with the algorithm in FIG. 9. The GPR data is consistent with that in FIG. 8. To observe a rule that each indicator of the method in the present invention varies with a quantity of random samples, in FIG. 9, the initial sample set N is set to 20, the plot scale range is set to 0.6 to 1.8, and the parameter $k_1=0.88, \theta_0=0.5$ matrix A is updated. In practical application, N=100.

Figure 10:
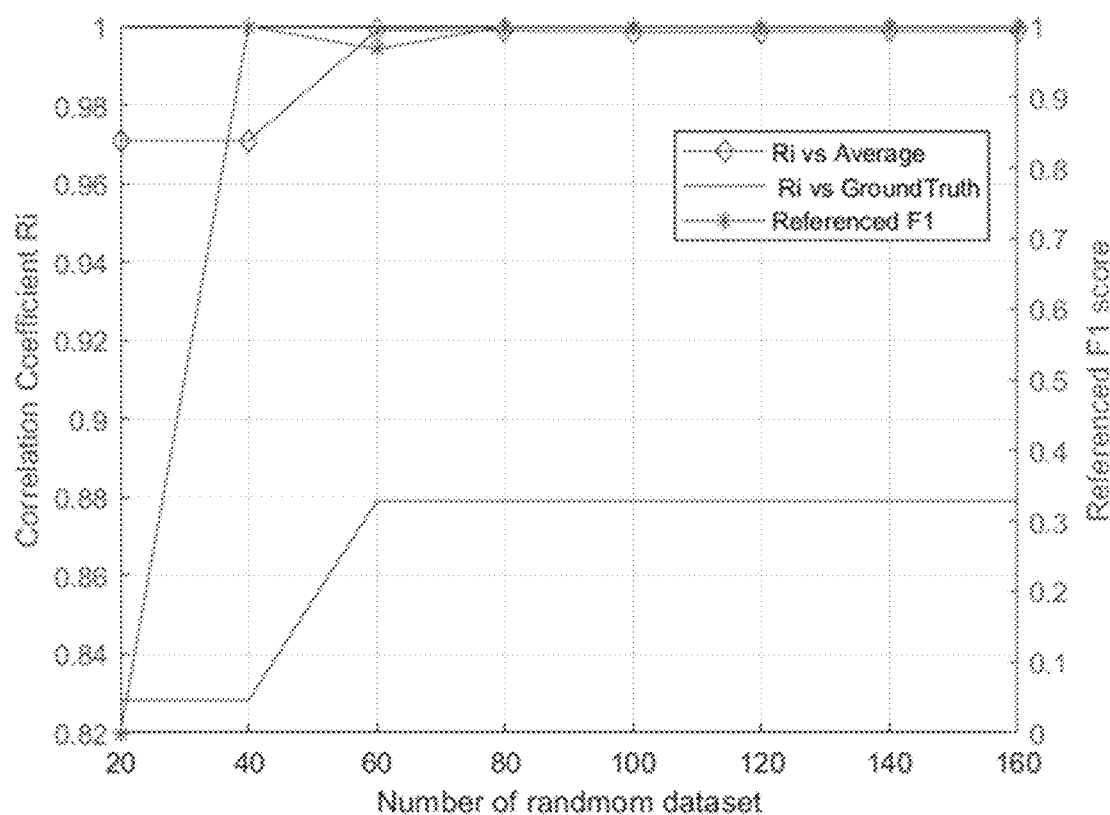
FIG. 10 shows a rule that a correlation coefficient varies with a quantity of sampling samples.

FIG. 10 shows a rule that a correlation coefficient varies with a quantity of sampling samples. In the figure, Referenced F1 is the indicator F1, and the other two curves are a correlation coefficient between a preferable image and a mean A and a correlation coefficient between the preferable image and a ground truth respectively. It can be seen from the figure that as the quantity of samples increases, the correlation coefficient $R_i$ increases and then reaches a fixed value. This shows that the algorithm in the present invention has found a preferable GPR image.

Figure 11:
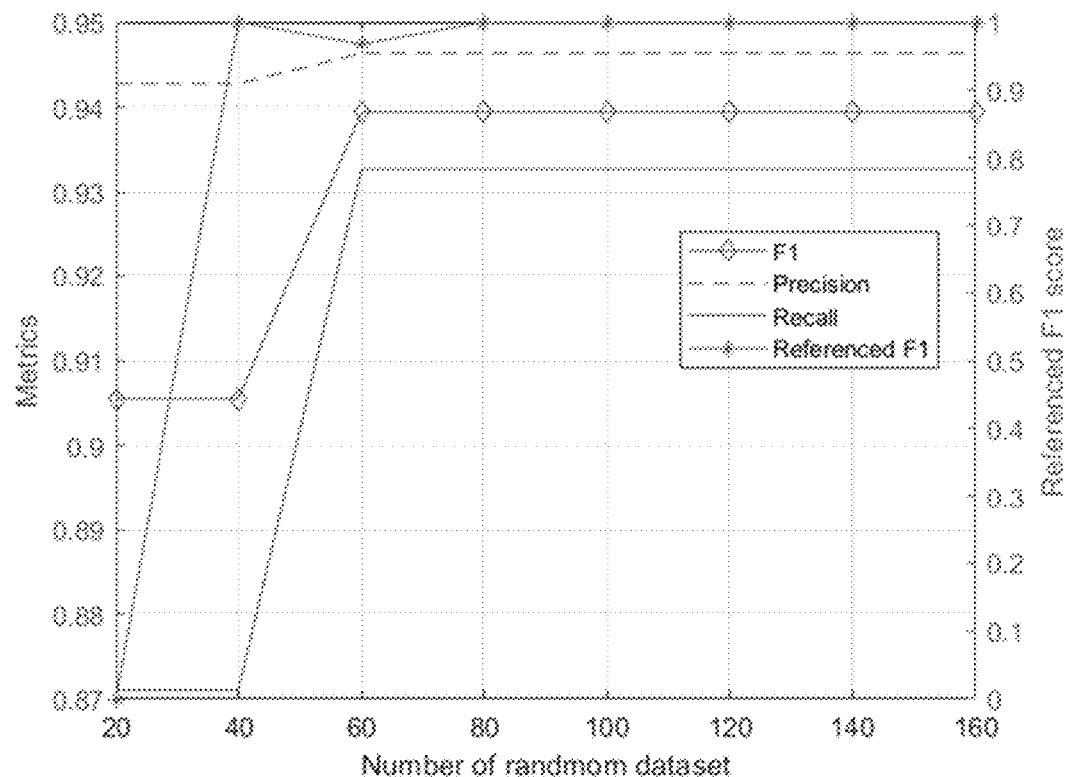
FIG. 11 shows a rule that related indicators of a deep model vary with a quantity of sampling samples.

FIG. 11 shows a rule that related indicators of the deep model vary with a quantity of sampling samples. F1, Precision, and Recall are evaluation indicators of the deep model. Similarly, after a preferable result is found, each indicator is stable, and indicates that an appropriate image has been found.

Figure 12:
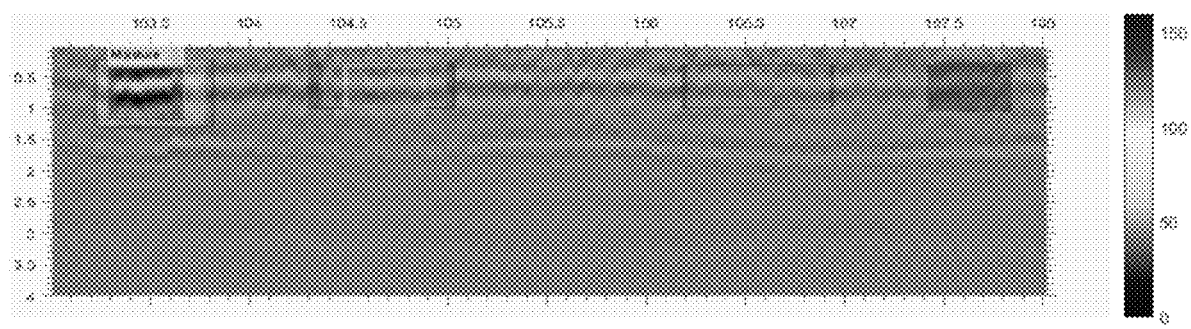
FIG. 12 is a heatmap of overall detection of a preferable image on a random dataset.

FIG. 12 is a heatmap of overall detection of a preferable image and a random dataset under 160 random sample sets. It can be seen that a moisture damage (target) exists in a region corresponding to 103.5 m in all the 160 images, which is consistent with the ground truth (represented by 1-4 in FIG. 8), and values of F1, Precision, and Recall each are greater than 0.93. This indicates that the preferable image approximates the ground truth, and verifies that the algorithm is correct.

Figure 13:
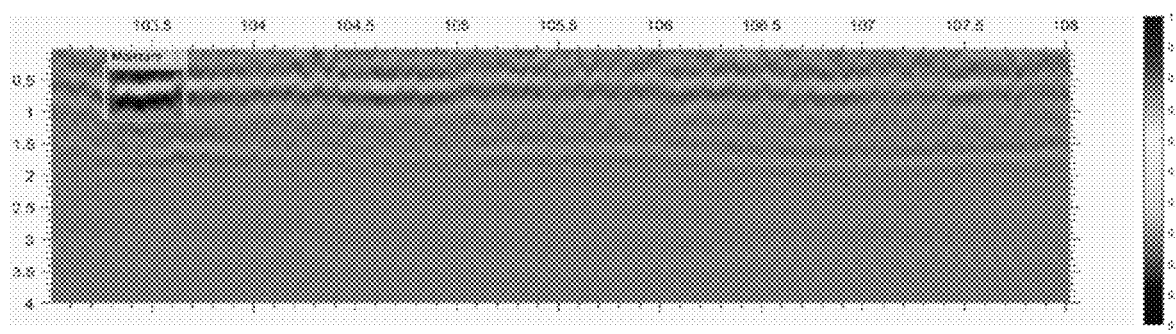
FIG. 13 is a heatmap of a preferable result and a mean A.

FIG. 13 is a heatmap of a preferable result and a mean A (in the heatmap, all detection results in a random image set are accumulated, and an accumulated result is reflected by a color). The mean A is obtained by averaging all values less than a maximum value multiplied by 0.8 in an update process. Through comparison, it is found that the detection result is highly consistent with the ground truth, which further verifies that the algorithm in the present invention is correct.

Figure 14:
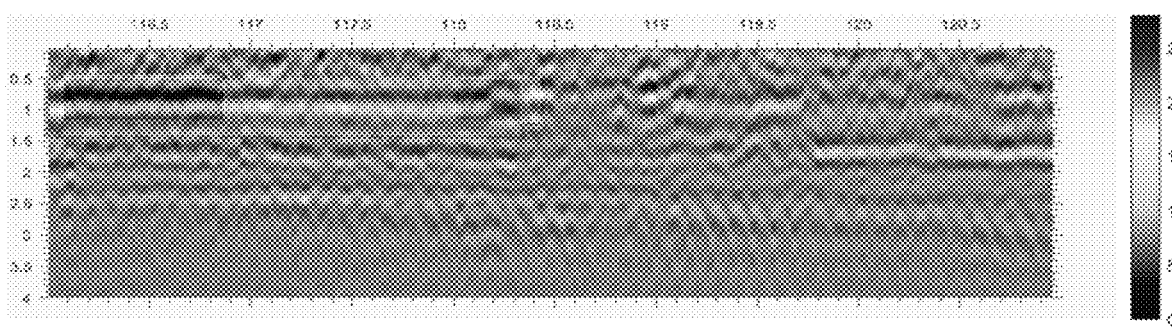
FIG. 14 is a heatmap of overall detection of a normal asphalt pavement on a random dataset.

FIG. 14 is a heatmap of overall detection of a normal asphalt pavement and a random dataset. An initial quantity of samples is 100, and a maximum value in this figure is only 28 (namely, 0.28), less than a threshold $\theta_0=0.5$. The test data is classified as data of the normal asphalt pavement, which is consistent with an actual situation.

Figure 15:
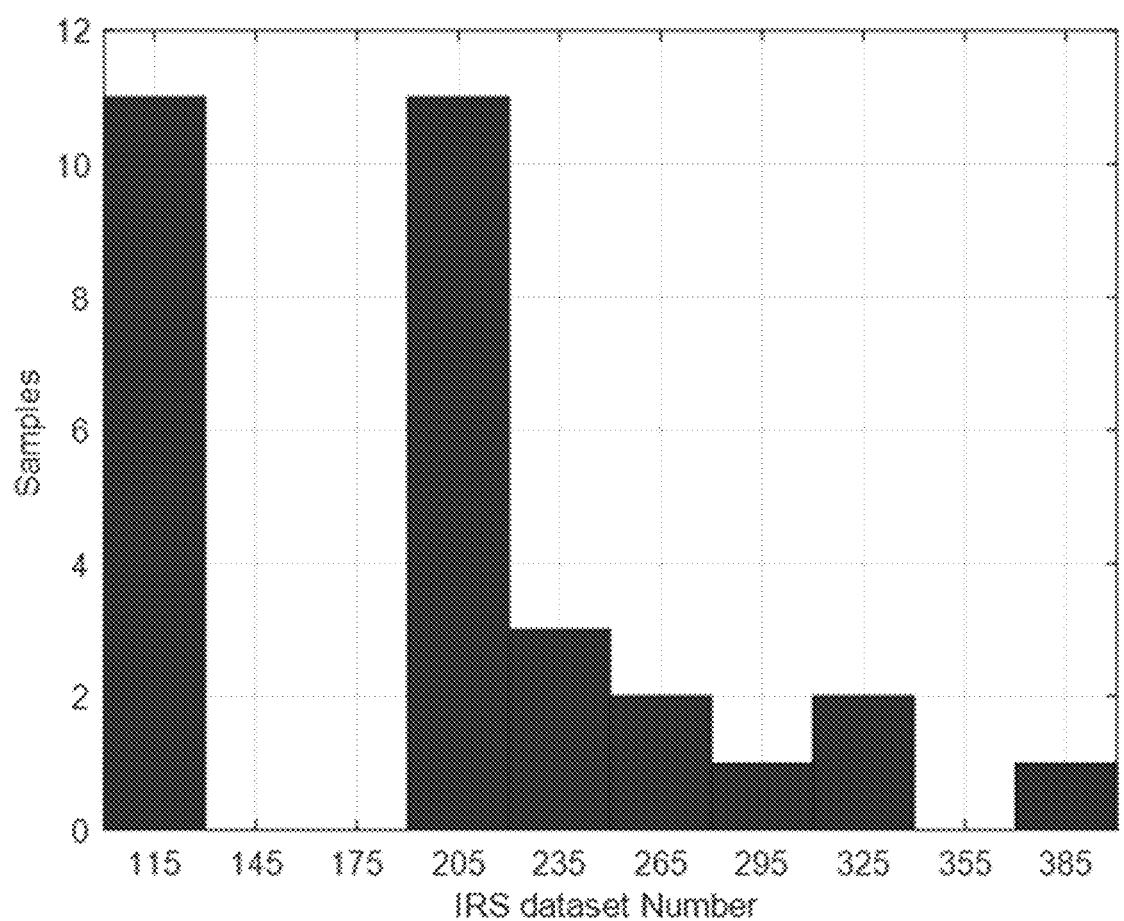
FIG. 15 shows a distribution rule of a quantity of random samples in a test dataset.

FIG. 15 shows a distribution rule of a quantity of random samples in a test dataset. 31 samples (11 normal asphalt pavements and 20 moisture damage samples) are tested by using the algorithm in the present invention. The results show that the algorithm in the present invention can effectively classify the 11 normal asphalt pavements based on 100 samples. However, 200 to 300 random samples are required for the moisture damage region. Because 95% asphalt pavements are normal, the algorithm can effectively save calculation costs.

Figure 16:
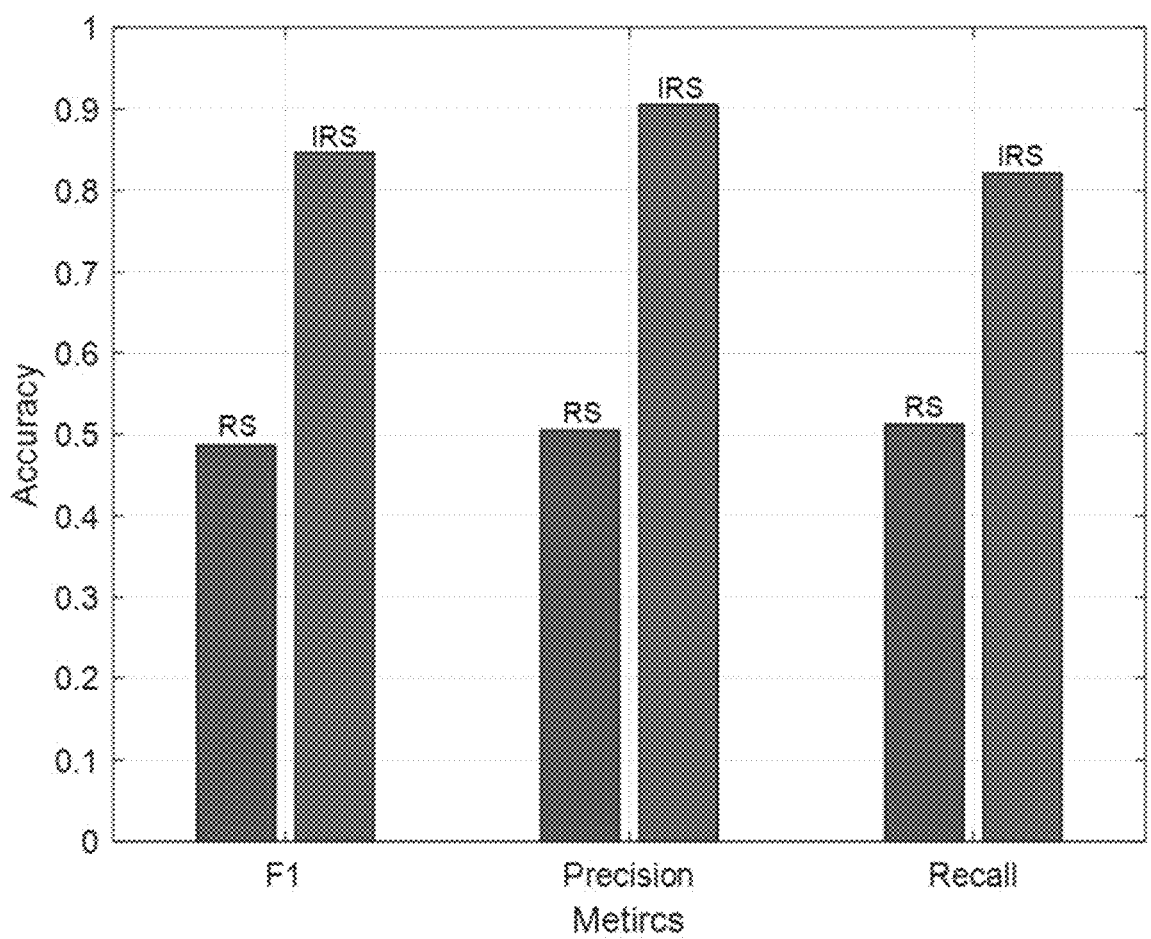
FIG. 16 compares an incremental random sampling (IRS) algorithm in the present invention and a random sample (RS) method in a moisture damage test set.
Figure 17:
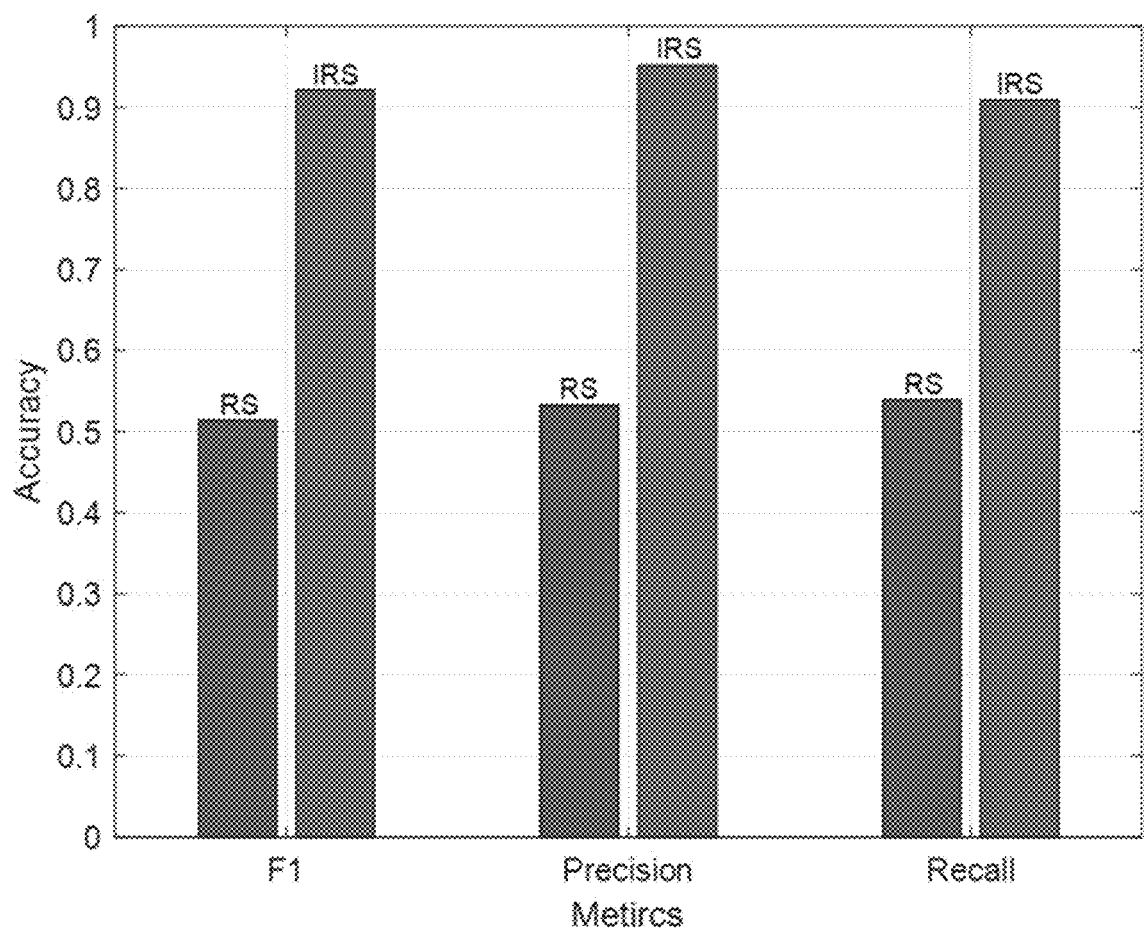
FIG. 17 compares an IRS algorithm in the present invention and an RS method on a normal asphalt pavement.

To further illustrate effectiveness of the algorithm (IRS) in the present invention and compare results obtained by using the IRS algorithm and the RS method, FIG. 16 shows a comparison result of data sets (20) with a moisture damage, and FIG. 17 adds results of 11 normal asphalt pavements. The results show that the IRS algorithm in the present invention can effectively recognize a defect with high precision.

The experiments show that the IRS algorithm in the present invention can be used together with the deep model to effectively select a GPR image with an appropriate plot scale from original GPR data, and provide an effective method for automatic application of the GPR.

Although the method in the present invention is verified through moisture damage recognition, the method is not limited to this case, and using the method to recognize targets in other GPR images is also within the protection scope of the present invention.

Embodiment 3

This embodiment provides a method for detecting a moisture damage on an asphalt pavement based on adaptive selection of a GPR image grayscale. As shown in FIG. 1 to FIG. 17, this method is basically the same as the method for detecting a moisture damage on an asphalt pavement in Embodiment 1, except that in step S12, "specifying a plot scale of the GPR image and intercepting the GPR image according to a length of 5 m to 6 m" is replaced with "selecting a GPR image with an appropriate plot scale and intercepting the GPR map according to a length of 5 m to 6 m".

The GPR image with the appropriate plot scale is selected according to an adaptive GPR image selection method.

The adaptive GPR image selection method is the same as the method for detecting a moisture damage on an asphalt pavement in Embodiment 2.

The recognition model in Embodiment 1 is the same as that in Embodiment 2. The post-processing step in Embodiment 1 is the same as that in Embodiment 2.

Embodiment 4

Figure 18:
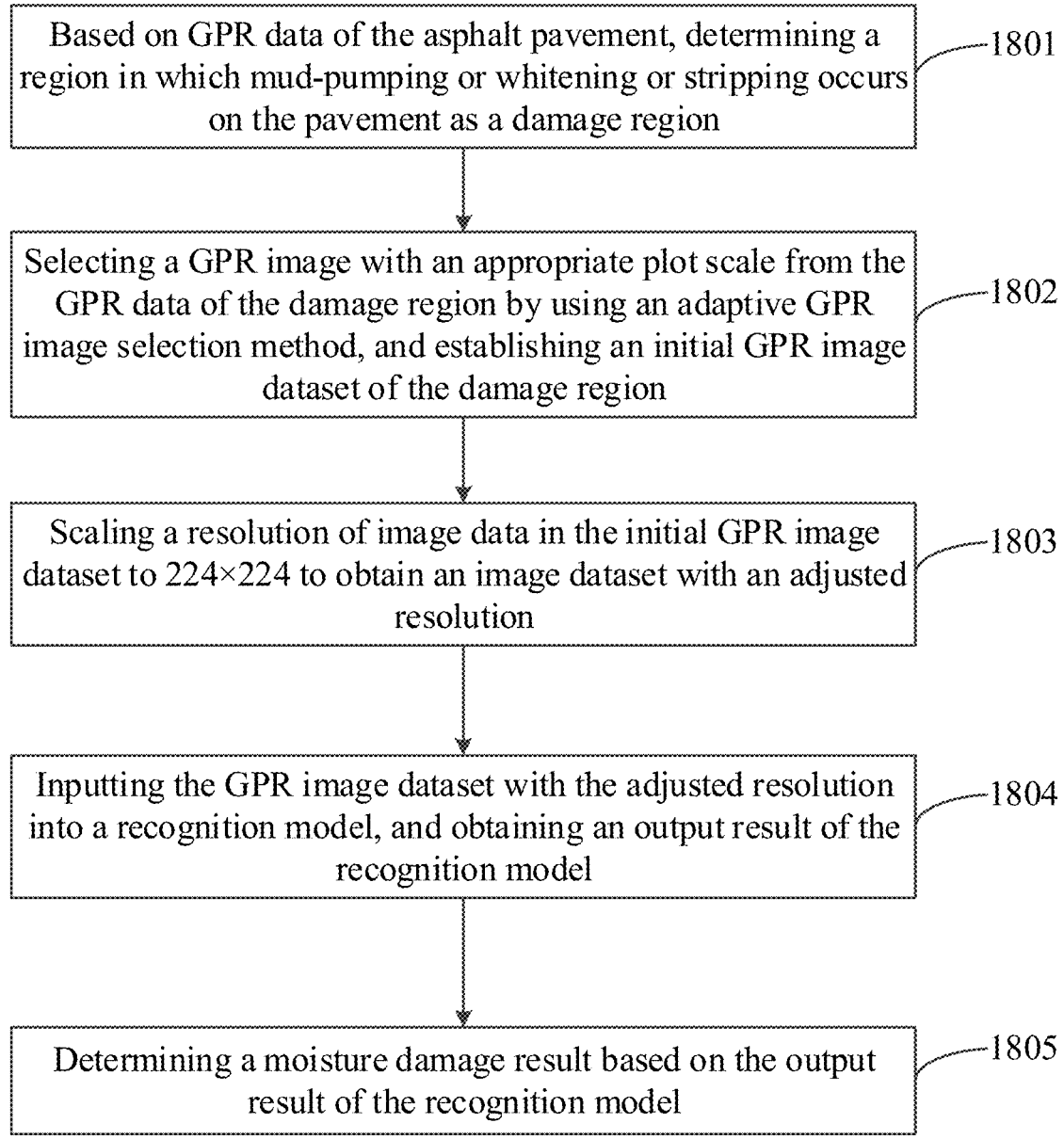
FIG. 18 is a flowchart of a method for detecting a moisture damage on an asphalt pavement based on adaptive selection of a GPR image grayscale.

As shown in FIG. 18, the present invention further provides a method for detecting a moisture damage on an asphalt pavement based on adaptive selection of a GPR image grayscale. The detection method includes the following steps:

Step 1801: Determine, based on GPR data of an asphalt pavement, a region in which mud-pumping or whitening or stripping occurs on the pavement as a damage region.

Step 1802: Select a GPR image with an appropriate plot scale from the GPR data of the damage region by using an adaptive GPR image selection method, and establish an initial GPR image dataset of the damage region, where a plot scale range specified in a process of selecting the GPR image with an appropriate plot scale is 1.2 to 1.6.

Step 1803: Scale resolution of image data in the initial GPR image dataset to 224×224 to obtain a GPR image dataset with adjusted resolution.

Step 1804: Input the GPR image dataset with adjusted resolution into a recognition model, and obtain an output result of the recognition model.

Step 1805: Determine a moisture damage result based on the output result of the recognition model.

In this specification, specific examples are used to describe the principle and implementations of the present invention, and the description of the embodiments is only intended to help understand the method and core idea of the present invention. Meanwhile, a person of ordinary skill in the art may, based on the idea of the present invention, make modifications with respect to the specific implementations and the application scope. Therefore, the content of this specification shall not be construed as a limitation to the present invention.

The embodiments of the present invention are described above with reference to the accompanying drawings, but the present invention is not limited to the foregoing specific implementations. The foregoing specific implementations are merely illustrative rather than restrictive. Under the teaching of the present invention, those of ordinary skill in the art may make many variations without departing from the spirit of the present invention and the protection scope of the claims, and all such variations fall within the protection scope of the present invention.

What is claimed is:

1. A method for detecting a moisture damage on an asphalt pavement based on adaptive selection of a ground penetrating radar (GPR) image grayscale, comprising the following steps:

step 1: obtaining a moisture damage GPR image dataset through asphalt pavement investigation by using a GPR, specifically comprising:

step S11: performing the asphalt pavement investigation and data collection by using the GPR: performing on-site data collection on the asphalt pavement by using a GPR system, and during the on-site data collection, determining a damage region on the asphalt pavement, wherein mud-pumping or whitening or stripping occurs in the damage region; and step S12: obtaining an initial GPR image dataset of a moisture damage: after preprocessing GPR data corresponding to the damage region, selecting a GPR image with an appropriate plot scale, intercepting the GPR image according to a length of 5 m to 6 m, constructing an initial GPR image dataset of the moisture damage, an initial GPR image dataset of a bridge joint, and an initial GPR image dataset of a normal asphalt pavement, and labeling respective features of the moisture damage, the bridge joint, and the normal asphalt pavement;

step 2: adjusting an image resolution:

defining the initial GPR image dataset of the damage as an ID dataset, scaling the ID dataset directly to 224×224 to obtain a first scaled dataset, and defining the first scaled dataset as a BD dataset; and scaling a resolution of the initial GPR image dataset of the damage directly to 224×224 to obtain the BD dataset;

step 3: inputting dataset into a recognition model, comprising:

inputting the BD dataset obtained in step 2 into the recognition model, performing operation by the recognition model, and then performing step 4, wherein an input image resolution of the recognition model is 224×224, and an output image resolution is 224×224; and the recognition model is a mixed deep learning model, and the mixed deep learning model is composed of ResNet50 for feature extraction and YOLO V2 framework for target detection;

step 4: outputting a moisture damage result:

performing a post-processing on an output result of the recognition model in step 3, wherein the post-processing comprises:

step S41: determining a quantity of candidate boxes BBoxes in an image in the output result, and performing step S42 when the quantity of the candidate boxes BBoxes is greater than 1, or directly outputting a result when the quantity of candidate boxes BBoxes is less than or equal to 1;

step S42: determining whether the candidate boxes BBoxes overlap, and performing step S43 when the candidate boxes BBoxes overlap, or directly outputting the result when the candidate boxes BBoxes do not overlap;

step S43: determining whether label names corresponding to overlapped candidate boxes BBoxes are identical, wherein when the label names corresponding to the overlapped candidate boxes BBoxes are identical, a label name corresponding to a combined candidate box BBox maintains unchanged; when the label names corresponding to the overlapped candidate boxes BBoxes are different, two types of label names respectively corresponding to the moisture damage and the bridge joint simultaneously exist, and an output label name is Joint;

step S44: combining the overlapped candidate boxes BBoxes by taking minimum values of x and y and maximum values of w and h of the overlapped candidate boxes BBoxes to obtain the combined candidate box BBox, wherein coordinates of the combined candidate box BBox are $[x_{min}, y_{min}, w_{max}, h_{max}]$; and step S45: outputting the result, wherein in the output result of the recognition model, the output image resolution is adjusted to the image resolution of the initial GPR image dataset of the damage, and the output result is an image with a label name of a target and a position (x, y, h) of a candidate box BBox corresponding to the target;

wherein, the GPR image with the appropriate plot scale is selected according to an adaptive GPR image selection method; and the adaptive GPR image selection method adaptively selects a suitable GPR image based on a plot scale value of the GPR image, and comprises the followings steps:

step (1): reading preprocessed GPR data:

after preprocessing the GPR data, randomly generating GPR images with different plot scales within a set plot scale range, and constructing an initial random GPR image dataset, wherein the initial random GPR image dataset comprises N images;

step (2): adjusting the image resolution:

defining the initial random GPR image dataset as an RID dataset, scaling the RID dataset directly to 224×224 to obtain a second scaled dataset, and defining the second scaled dataset as an RBD dataset; and scaling a resolution of the initial GPR image dataset of the moisture damage directly to 224×224 to obtain the RBD dataset;

step (3): inputting dataset into the recognition model:

inputting the RBD dataset obtained in step (2) into the recognition model, performing operation by the recognition model, and then performing step (4), wherein the recognition model is identical to the recognition model in step 3;

step (4): outputting the moisture damage result:

performing the post-processing on an output result of the recognition model in step (3), wherein the post-processing is identical to the post-processing in step 4, and the output result is the image with the label name of the target and the position (x, y, w, h) of the candidate box BBox corresponding to the target;

step (5): determining, by using the initial random GPR image dataset, whether a detection target exists:

step S51: converting the output result in step (4) into a matrix $A_i$ corresponding to pixels on an image, wherein $A_i$ is defined as follows:

$$A_i[m, n] = \begin{cases} 1, & x_i \le m \le x_i + W_i \text{ and } y_i \le n \le y_i + h_i \\ 0, & \text{other} \end{cases},$$

where $1 \le m \le H_0, 1 \le n \le W_0$, wherein $H_0$ represents an image height of the image output by the recognition model, and $W_0$ represents an image width of the image output by the recognition model; and performing sum on the matrices $A_i$ corresponding to the N images in the RID dataset, and averaging the matrices $A_i$ to obtain a mean matrix A, wherein the mean matrix A is defined as:

$$A = \frac{1}{N}\sum_{i=1}^{N} A_i;$$

and step S52: setting $k_1=1=0.8$ and $\theta_0=0.5$, and updating the mean matrix A according to the following formula to obtain an updated mean matrix A:

$$A(A<\max(k_1*\max(\max(A)),\theta_0))=0,$$

wherein, $k_1$ represents a target correlation coefficient;

$\theta_0$ represents a minimum value in the matrix A when the target exists, wherein the target does not exist when a value is less than the minimum value; and max(max(A)) represents a maximum value in the mean matrix; and step S53: based on the updated mean matrix A, according to the following formula, obtaining a condition T for determining whether the target exists, wherein the target exists when T=1, and the target does not exist when T=0:

$$T = \begin{cases} 1, & \text{where } \max(\max(A)) > 0 \\ 0, & \text{where } \max(\max(A)) = 0 \end{cases};$$

and step (6): randomly generating GPR images incrementally, and selecting the image with the appropriate plot scale: when the target exists in the image, performing initial determining:

step S61: when Flag=0, indicating that a random GPR image sample set is generated for a first time wherein a sample set initialization stage is currently available and no determining for subsequent selection is performed, setting Flag=1, adding 5% of the N images as samples of the initial random GPR image dataset, and returning to step (2), wherein a total quantity of images in a sample set is N=(1+5%)N; or step S62: when Flag≠0, indicating that a non-initialization stage is currently available, setting an image correlation coefficient, and selecting an image having a maximum correlation coefficient with the mean matrix A to be the image with the appropriate plot scale, wherein the image correlation coefficient $R_i$ is defined as follows:

$$R_i = \frac{\sum_{m=1}^{H_0}\sum_{n=1}^{W_0}(A(m,n)-\mu_A)(A_i(m,n)-\mu_{A_i})}{\sqrt{\sum_{m=1}^{H_0}\sum_{n=1}^{W_0}(A(m,n)-\mu_A)^2 \sum_{m=1}^{H_0}\sum_{n=1}^{W_0}(A_i(m,n)-\mu_{A_i})^2}},$$

wherein $R_i$ represents a correlation coefficient between the matrix $A_i$ corresponding to an $i^{th}$ image and the mean matrix A, m represents a coordinate value in a height direction, n represents a coordinate value in a width direction, $\mu_A$ represents a grand mean of the mean matrix A, and $\mu_{A_i}$ represents a grand mean of the matrix $A_i$;

a stop condition for a selection process is as follows:

$$\text{STOP} = \text{abs}(F1 - F1_{pre}) < 0.01 \text{ \&\& } F1 > 0.8,$$

$$F1 = 2 * \frac{\text{Precision} \cdot \text{Recall}}{\text{Precision} + \text{Recall}},$$

$$\text{Precision} = \frac{TP}{TP+FP},$$

$$\text{Recall} = \frac{TP}{TP+FN},$$

wherein F1 represents an evaluation indicator of a deep learning; $F1_{Pre}$ represents an evaluation indicator of a previous deep learning, and is initially set to 0; TP represents a true target region, FP represents a falsely recognized ground truth, and indicates that an unrecognized ground truth is falsely determined as a negative value or a background; and FN represents a falsely recognized negative value, and indicates that the background is recognized as the target;

wherein when the stop condition is not met, the variable $F1_{Pre}$ is set to a currently calculated indicator F1, then step S61 is returned, and the sample set is expanded to perform re-selection;

when the stop condition is met, a system outputs the image with the appropriate plot scale.

2. The method according to claim 1, wherein in step S11, during the on-site GPR data collection, a sampling spacing is <15 cm, an antenna frequency is >1.6 GHz, and a sampling frequency is 10 to 20 times an antenna central frequency;

in step S12, the preprocessing is performed by using a direct current (DC) drift correction algorithm, a ground correction algorithm, a background subtraction algorithm, a band-pass filtering algorithm, and a moving average algorithm; and in step S12, the appropriate plot scale of the GPR image is set to 1.2 to 1.6.

3. The method according to claim 1, wherein the image resolution of the initial GPR image dataset is 1090×300, the set plot scale range is 0.5 to 1.8, and N=100.

4. A method for detecting a moisture damage on an asphalt pavement based on adaptive selection of a ground penetrating radar (GPR) image grayscale, comprising the following steps:

based on GPR data of the asphalt pavement, determining a region on the asphalt pavement as a damage region, wherein mud-pumping or whitening or stripping occurs in the region;

selecting a GPR image with an appropriate plot scale from the GPR data of the damage region by using an adaptive GPR image selection method, and establishing an initial GPR image dataset of the damage region;

scaling a resolution of image data in the initial GPR image dataset to 224×224 to obtain an image dataset with an adjusted resolution;

inputting the GPR image dataset with the adjusted resolution into a recognition model, and obtaining an output result of the recognition model; and determining a moisture damage result based on the output result of the recognition model.

5. The method according to claim 4, wherein the step of selecting the GPR image with the appropriate plot scale from the GPR data of the damage region by using the adaptive GPR image selection method, and establishing the initial GPR image dataset of the damage region specifically comprises:

randomly generating GPR images with different plot scales within a set plot scale range based on the GPR data of the damage region, constructing an initial random GPR image dataset, wherein the initial random GPR image dataset comprises N GPR images, and initializing a value of a flag bit Flag to 0;

scaling a resolution of image data in the initial random GPR image dataset to 224×224 to obtain a random GPR image dataset with the adjusted resolution;

inputting the random GPR image dataset with the adjusted resolution into the recognition model, and obtaining a moisture damage result of each piece of the image data in the random GPR image dataset with the adjusted resolution;

labeling each piece of the image data in the random GPR image dataset with the adjusted resolution based on the moisture damage result of each piece of the image data in the random GPR image dataset with the adjusted resolution, obtaining a GPR image with a label name of a target and a position (x, y, w, h) of a candidate box BBox corresponding to the target, and establishing a labeled random GPR image dataset;

determining a corresponding matrix of each GPR image with the label name of the target and the position of the candidate box BBox corresponding to the target in the labeled random GPR image dataset to be a corresponding matrix of each piece of the GPR image in the initial random GPR image dataset, and calculating a mean of the corresponding matrix of each GPR image with the label name of the target and the position of the candidate box BBox corresponding to the target in the labeled random GPR image dataset to obtain a mean matrix;

updating the mean matrix based on a target correlation coefficient and a target determining coefficient to obtain an updated mean matrix;

determining, based on the mean matrix, whether the initial random GPR image dataset contains a moisture damage detection target, and obtaining a first determining result; and when the first determining result indicates that the initial random GPR image dataset does not contain the moisture damage detection target, returning the step of randomly generating GPR images with different plot scales within the set plot scale range based on the GPR data of the damage region, constructing the initial random GPR image dataset comprising the N GPR images, and initializing the value of the flag bit Flag to 0;

when the first determining result indicates that the initial random GPR image dataset contains the moisture damage detection target, determining whether the value of the flag bit Flag is 0, and obtaining a second determining result;

when the second determining result indicates that the value of the flag bit Flag is 0, updating the value of the flag bit Flag to 1, adding 5% of N GPR images to the initial random GPR image dataset within the set plot scale range based on the GPR data of the damage region, updating a value of N, and returning the step of scaling the resolution of image data in the initial random GPR image dataset to 224×224 to obtain the random GPR image dataset with the adjusted resolution; and when the second determining result indicates that the value of the flag bit Flag is not 0, selecting GPR image with a maximum correlation coefficient between the corresponding matrix and the mean matrix from the initial random GPR image dataset to be the GPR image with the appropriate plot scale;

determining whether a stop condition for selecting the GPR image with the appropriate plot scale is met, and obtaining a third determining result;

when the third determining result indicates that the stop condition for selecting the GPR image with the appropriate plot scale is not met, adding 5% of the N GPR images to the initial random GPR image dataset within the set plot scale range based on the GPR data of the damage region, updating the value of N, and returning the step of scaling the resolution of image data in the initial random GPR image dataset to 224×224 to obtain the random GPR image dataset with the adjusted resolution; and when the third determining result indicates that the stop condition for selecting the GPR image with the appropriate plot scale is met, outputting each GPR image with the appropriate plot scale, and establishing the initial GPR image dataset.

6. The method according to claim 5, wherein the step of determining the corresponding matrix of each GPR image with the label name of the target and the position of the candidate box BBox corresponding to the target in the labeled random GPR image dataset to be the corresponding matrix of each piece of the image in the initial random GPR image dataset, and calculating the mean of the corresponding matrix of each image with the label name of the target and the position of the candidate box BBox corresponding to the target in the labeled random GPR image dataset to obtain the mean matrix specifically comprises:

determining the corresponding matrix of each image with the label name of the target and the position of the candidate box BBox corresponding to the target in the labeled random GPR image dataset to be the corresponding matrix of each piece of the image in the initial random GPR image dataset according to the following formula:

$$A_i(m, n) = \begin{cases} 1, & x_{ij} \leq m \leq x_{ij} + W_{ij} \text{ and } y_{ij} \leq n \leq y_{ij} + h_{ij}, j = 1, 2, \ldots, J_i \\ 0, & \text{other} \end{cases},$$

where $1 \leq m \leq H_i, 1 \leq n \leq W_i$ wherein $A_i(m,n)$ represents an $(m,n)^{th}$ element in a corresponding matrix of an $i^{th}$ image with the label name of the target and the position of the candidate box BBox corresponding to the target, $(x_{ij}, y_{ij})$ represents start coordinates of a $j^{th}$ candidate box BBox in the $i^{th}$ image with the label name of the target and the position of the candidate box BBox corresponding to the target, $W_{ij}$ and $h_{ij}$ respectively represent a width and a height of the $j^{th}$ candidate box BBox in the $i^{th}$ image with the label name of the target and the position of the candidate box BBox corresponding to the target, $H_i$ represents a height of the $i^{th}$ image with the label name of the target and the position of the candidate box BBox corresponding to the target, $W_i$ represents a width of the $i^{th}$ image with the label name of the target and the position of the candidate box BBox corresponding to the target, and $J_i$ represents a quantity of candidate boxes BBoxes in the $i^{th}$ image with the label name of the target and the position of the candidate box BBox corresponding to the target; and for the corresponding matrix of each image with the label name of the target and the position of the candidate box BBox corresponding to the target in the labeled random GPR image dataset, according to a formula $$A = \frac{1}{N}\sum_{i=1}^{N} A_i,$$

calculating the mean matrix, wherein $A_i$ represents the corresponding matrix of the $i^{th}$ image with the label name of the target and the position of the candidate box BBox corresponding to the target, and A represents the mean matrix.

7. The method according to claim 6, wherein the step of selecting the GPR image with the maximum correlation coefficient between the corresponding matrix and the mean matrix from the initial random GPR image dataset to be the GPR image with the appropriate plot scale specifically comprises:

calculating a correlation coefficient between the corresponding matrix of each piece of the image in the initial random GPR image dataset and the mean matrix according to the following formula:

$$R_i = \frac{\sum_{m=1}^{H_0}\sum_{n=1}^{W_0}(A(m,n)-\mu_A)(A_i(m,n)-\mu_{A_i})}{\sqrt{\sum_{m=1}^{H_0}\sum_{n=1}^{W_0}(A(m,n)-\mu_A)^2 \sum_{m=1}^{H_0}\sum_{n=1}^{W_0}(A_i(m,n)-\mu_{A_i})^2}}.$$

wherein $R_i$ represents a correlation coefficient between the corresponding matrix $A_i$ of an $i^{th}$ piece of the GPR image and the mean matrix A, A(m,n) represents an $(m,n)^{th}$ element in the mean matrix, $\mu_A$ represents a grand mean of the mean matrix A, and $\mu_{A_i}$ represents a grand mean of the corresponding matrix $A_i$ of the $i^{th}$ piece of GPR image; and selecting the GPR image with the maximum correlation coefficient between the corresponding matrix and the mean matrix from the initial random GPR image dataset to be the GPR image with the appropriate plot scale.

8. The method according to claim 5, wherein the step of determining, based on the mean matrix, whether the initial random GPR image dataset contains the moisture damage detection target, and obtaining the first determining result specifically comprises:

setting the target correlation coefficient $k_1$=0.8 and the target determining coefficient $\theta_0$=0.5, and updating the mean matrix A according to the following formula to obtain the updated mean matrix:

$$A'(m,n) = \begin{cases} 0 & A(m,n) < \max(k_1^* \max(\max(A)), \theta_0)) \\ A(m,n) & \text{else} \end{cases},$$

wherein max(max(A)) represents a maximum value in the mean matrix, A(m,n) represents an $(m,n)^{th}$ element in the mean matrix, and A'(m,n) represents an $(m,n)^{th}$ element in the updated mean matrix; and calculating a value of a determining condition T based on the updated mean matrix and according to the following formula:

$$T = \begin{cases} 1, & \text{where } \max(\max(A')) > 0 \\ 0, & \text{where } \max(\max(A')) = 0 \end{cases},$$

wherein max(max(A')) represents a maximum value in the updated mean matrix; wherein when the value of the determining condition T is 1, the first determining result is that the initial random GPR image dataset contains the moisture damage detection target; or when the value of the determining condition T is 0, the first determining result is that the initial random GPR image dataset does not contain the moisture damage detection target.

9. The method according to claim 5, wherein the stop condition for selecting the GPR image with the appropriate plot scale is as follows:

$$STOP = \text{abs}(F1 - F1_{pre}) < 0.01 \,\&\&\, F1 > 0.8;$$

$$F1 = 2 * \frac{\text{Precision} \cdot \text{Recall}}{\text{Precision} + \text{Recall}};$$

$$\text{Precision} = \frac{TP}{TP+FP};$$

$$\text{Recall} = \frac{TP}{TP+FN};$$

wherein F1 represents an evaluation indicator of a deep learning; $F1_{Pre}$ represents an evaluation indicator of a previous deep learning, and is initially set to 0; TP represents a true target region, FP represents a falsely recognized ground truth, and indicates that an unrecognized ground truth is falsely determined as a negative value or a background; FN represents a falsely recognized negative value, and indicates that the background is recognized as the target; Precision represents a first intermediate value; Recall represents a second intermediate value; and STOP represents stopping a selection of the GPR image with the appropriate plot scale.

10. The method according to claim 5, wherein the step of determining the moisture damage result based on the output result of the recognition model specifically comprises:

determining whether a quantity of candidate boxes BBoxes in an image in the output result of the recognition model is greater than 1, and obtaining a fourth determining result;

when the fourth determining result indicates that the quantity of the candidate boxes BBoxes in the image in the output result of the recognition model is less than or equal to 1, using the output result of the recognition model as an initial moisture damage result;

when the fourth determining result indicates that the quantity of the candidate boxes BBoxes in the image in the output result of the recognition model is greater than 1, determining whether overlapped candidate boxes BBoxes exist, and obtaining a fifth determining result;

when the fifth determining result indicates that the overlapped candidate boxes BBoxes do not exist, using the output result of the recognition model as the initial moisture damage result;

when the fifth determining result indicates that the overlapped candidate boxes BBoxes exist, determining whether label names corresponding to the overlapped candidate boxes BBoxes are identical, and obtaining a sixth determining result;

when the sixth determining result indicates that the label names corresponding to the overlapped candidate boxes BBoxes are not identical, updating the label names of the overlapped candidate boxes BBoxes to Joint, and outputting, as the initial moisture damage result, a result output by the recognition model after the label names of the overlapped candidate boxes BBoxes are updated;

when the sixth determining result indicates that the label names corresponding to the overlapped candidate boxes BBoxes are identical, taking minimum values of x and y and maximum values of w and h of the overlapped candidate boxes BBoxes to obtain a combined candidate box BBox having coordinates of $[x_{min}, y_{min}, w_{max}, h_{max}]$, and using, as the initial moisture damage result, a result output by the recognition model after the overlapped candidate boxes BBoxes are combined; and adjusting a resolution of the initial moisture damage result to the resolution of the image data in the initial GPR image dataset to obtain a final moisture damage result.

* * * * *